(12) United States Patent
Tsutsui

(10) Patent No.: US 6,496,898 B1
(45) Date of Patent: Dec. 17, 2002

(54) INFORMATION RECORD/REPRODUCTION DEVICE, INFORMATION RECORD/REPRODUCTION METHOD AND SUPPLY MEDIUM THEREOF

(75) Inventor: Kyoya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/384,151

(22) Filed: Aug. 27, 1999

(30) Foreign Application Priority Data

Sep. 2, 1998 (JP) ............................................. 10-248077

(51) Int. Cl.$^7$ .............................................. G06F 12/00
(52) U.S. Cl. ........................................ 711/112; 711/113
(58) Field of Search .................................. 711/112, 113

(56) References Cited

U.S. PATENT DOCUMENTS

| | | | |
|---|---|---|---|
| 5,724,546 A | 3/1998 | Tsutsui | |
| 5,796,695 A | 8/1998 | Tsutsui | |
| 6,016,348 A | * 1/2000 | Blatter et al. | ................... 380/5 |
| 6,081,784 A | 6/2000 | Tsutsui | |
| 6,167,136 A | * 12/2000 | Chou | ......................... 380/201 |
| 6,182,215 B1 | * 1/2001 | Tatebayashi et al. | ........ 713/168 |

OTHER PUBLICATIONS

Computer Architecture A Quantitative Approach, David A Patterson, 1996 Morgan Kaufman Publishers, Inc. Chapter 2, section 2.6, pp. 87–88.*

* cited by examiner

Primary Examiner—Matthew Kim
Assistant Examiner—C. P. Chace
(74) Attorney, Agent, or Firm—Sonnenschein, Nath & Rosenthal

(57) ABSTRACT

An information record/reproduction device, method and supply medium thereof to speedily acquire information as well as prevent illegal copying. In the recording system of information record/reproduction device, encoded information recorded on a semiconductor memory is read out from an information provider device by an encoder/decoder section and decoded by utilizing an encoder key K[BA] and then output to an encoder section. In the encoder section, the information decoded by the encoder/decoder section is encrypted and output to a RAM device. The encrypted information input into the RAM is then recorded on an magneto-optic disk.

8 Claims, 22 Drawing Sheets

F I G. 10
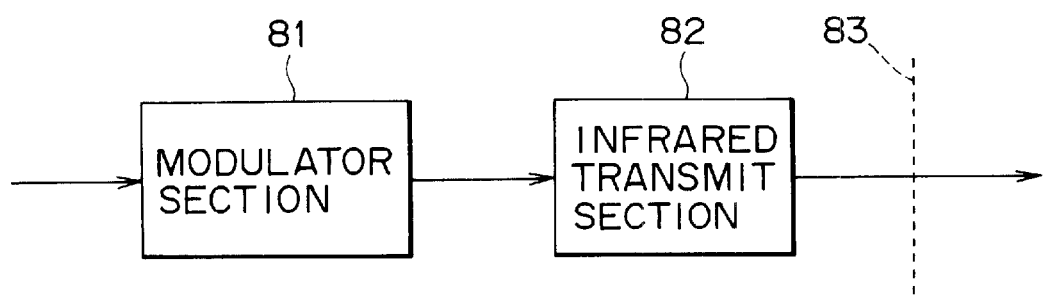
F I G. 11
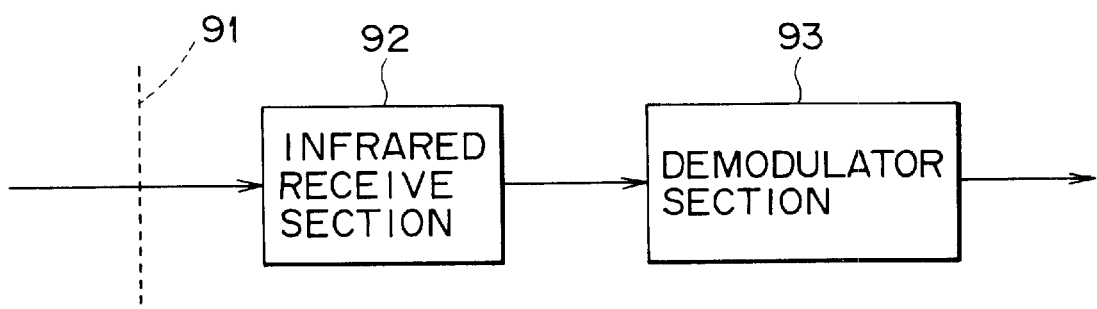

| A | B | A⊕B | A⊕B⊕B |
|---|---|-----|-------|
| 0 | 0 | 0   | 0     |
| 0 | 1 | 1   | 0     |
| 1 | 0 | 1   | 1     |
| 1 | 1 | 0   | 1     |

FIG. 22

| CA PUBLIC KEY : CAP |
|---|
| UNIT ID NO. : ID |
| CORRECTNESS CHECK DATA : CT |
| COMMUNICATION PUBLIC KEY : CMP |
| COMMUNICATION PRIVATE KEY : CMS |
| DATA ENCODING PRIVATE KEY : DEK |

INFORMATION RECORD/REPRODUCTION DEVICE, INFORMATION RECORD/REPRODUCTION METHOD AND SUPPLY MEDIUM THEREOF

BACKGROUND OF THE INVENTION

1. Field of the Invention

The present invention relates to an information record/reproduction device, information record/reproduction method and supply medium and relates in particular to an information record/reproduction device, information record/reproduction method and supply medium capable of speedy acquisition of information such as news or music, etc.

2. Description of Related Art

The applicant of this invention previously disclosed a method in Japanese Laid Open Patent 6-251564 for speedily acquiring information such as the news and the storing of desired items from among that acquired information. This proposed method not only allowed reusing of an expensive recording medium but also storing information once that information had been acquired.

More specifically as shown in FIG. 28, an information provider unit 220 stores the provided information such as news. The user refers to the information contents and prices as shown on a plurality of displays 221 and operates an output selector 222 to select the desired information for insertion to a information record/reproduction device 201 by way of an insertion/extraction slot 223. The information record/reproduction device 201 is configured to record the information acquired from the information provider unit 220 onto a primary record medium 210. The information record/reproduction device 201 receives the command entered by the user by way of a selector 203, and reads out (or loads) information corresponding to that command from information provider unit 220, and besides displaying that information on a display 202 also outputs the information to an earphone 204. The primary record medium 210 is comprised of a semiconductor memory that is expensive but has a fast information transfer speed.

When the information from the information provider unit 220 is recorded from the information record/reproduction device 201 onto the primary record medium 210, an information secondary record/reproduction device 230 is configured to read out (or load) the information recorded on the primary record medium 210 and record it onto an internal secondary record medium. This internal secondary record medium may for instance consist of an magneto-optic disk which has large memory capacity and is inexpensive compared to the semiconductor memory.

However, the above mentioned method had the problem that the information record/reproduction device 201 for recording information on the primary record medium 210; and the information secondary record/reproduction device 230 for recording information on the secondary record medium were two separate devices so that operation was troublesome to perform.

Another problem with the above mentioned method was that the information recorded on the primary record medium 210 was recorded on a plurality of secondary record mediums so that illegal copying could not be prevented.

SUMMARY OF THE INVENTION

In view of the above problems with the conventional art, this invention has the object of speedily acquiring information.

An information record/reproduction device as claimed in claim 1 is characterized in containing a receive means to receive the transmitted information, a storage means to store the information received by the receive means, and a record means to record onto a record medium the information stored by the storage means.

An information record/reproduction method as claimed in claim 7 is characterized in containing a receive step to receive the transmitted information, a storage step to store the information received by the receive step, and a record step to record onto a record medium the information stored by the storage step.

A supply medium as claimed in claim 8 is characterized by providing a program capable of being loaded into a computer for running an information record/reproduction device including the processing for performing a receive step to receive the transmitted information, a storage step to store the information received by the receive step, and a record step to record onto a record medium the information stored by the storage step.

An information record/reproduction device as claimed in claim 1 is characterized in that a receive means receives the transmitted information, a storage means stores the information received by the receive means, and a record means records onto a record medium the information stored by the storage means.

An information record/reproduction method as claimed in claim 7 and a supply medium as claimed in claim 8 are characterized by a receive step to receive the transmitted information, a storage step to store the information received by the receive step, and a record step to record onto a record medium the information stored by the storage step.

BRIEF DESCRIPTION OF THE DRAWINGS

FIG. 10 is a block diagram showing the structure of the transmit section 46 of FIG. 4.

FIG. 11 is a block diagram showing the structure of the receive section 44 of FIG. 4.

FIG. 22 is a block diagram showing the information recorded on the non-volatile memory 174 of FIG. 21.

DETAILED DESCRIPTION OF THE PREFERRED EMBODIMENTS

Figure 1:
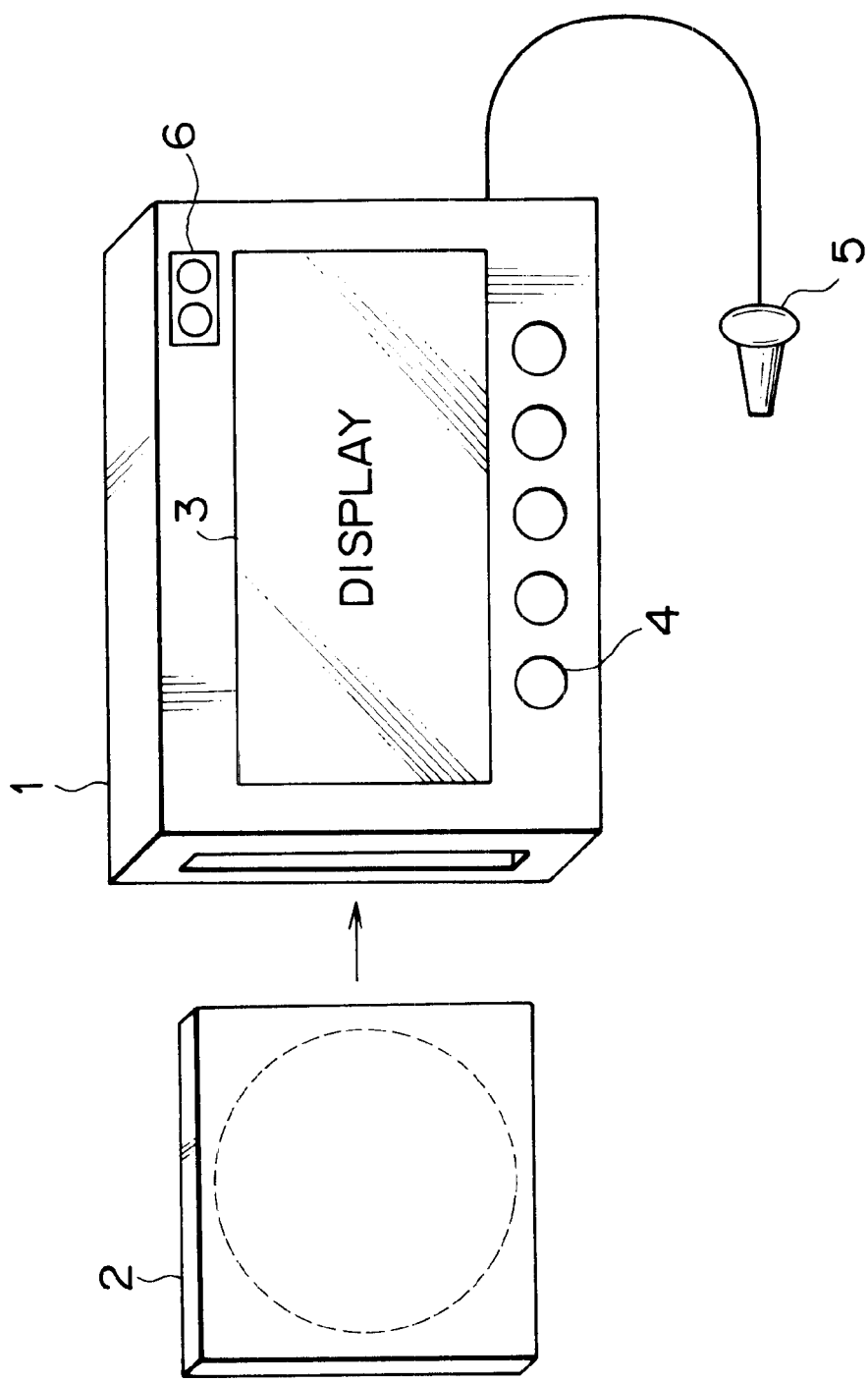
FIG. 1 is a drawing showing an external view of the information record/reproduction device 1 of this invention.

Hereafter the embodiments of this invention are explained, however in order to clarify the relation of the following embodiments with the respective means of the invention listed within the scope of the claims, the corresponding embodiment (just one working example) is listed within the parentheses following the means and the characteristic of this invention related as follows. Needless to say, these descriptions should not be interpreted as limiting the scope of the means of this invention.

An information record/reproduction device as claimed in claim 1 is characterized for instance in comprising a receive means to receive the transmitted information (for instance, a receive section 37 of FIG. 25) a storage means (for instance, a semiconductor memory 38 of FIG. 25) to store the information received by the receive means, and a record means (for instance, a magnetic head 24 of FIG. 25) to record onto a record medium the information stored by the storage means.

An information record/reproduction device as claimed in claim 2 is characterized in further containing an encrypting means (for instance, an encrypter section 181 of FIG. 25) for encrypting information stored by said storage means.

An in formation record/reproduction device as claimed in claim 4 is characterized in further containing a reproduction means (for instance, an ATC decoder 31 of FIG. 25) for reproducing information stored by said storage means or information recorded in said recording medium.

An information record/reproduction device as claimed in claim 5 is characterized in further containing a decoding means (for instance an encrypter/decoder 182) for decoding the encoded information received by the receive means.

The external appearance of the information record/reproduction device applicable to this invention is shown in FIG. 1. This information record/reproduction device 1 stores information acquired from an information provider unit 11 shown in FIG. 2 and stores the information inside a semiconductor memory 38 (FIG. 3) and later records this information in a detachable magneto-optic disk 2. The information provided by the information provider unit 11 is text information, audio information and video information and not subject to any particular restrictions.

A display 3 shows the information contents (text information or image information) stored in the magneto-optic disk 2 or the semiconductor memory 38. The selector section 4 is configured to select information for reproduction by the user pressing the desired button. When the information selected by the user is audio information, an earphone.5 outputs this reproduced audio information to the user. A speaker may also be used along with the earphone 5 or instead of the earphone 5. Further, the reproduced audio information may be output to an external speaker by way of an external terminal not shown in the drawings.

A transceiver 6 is configured to communicate information with an information provider unit 11 utilizing infrared rays or another information record/reproduction device without direct contact.

Figure 2:
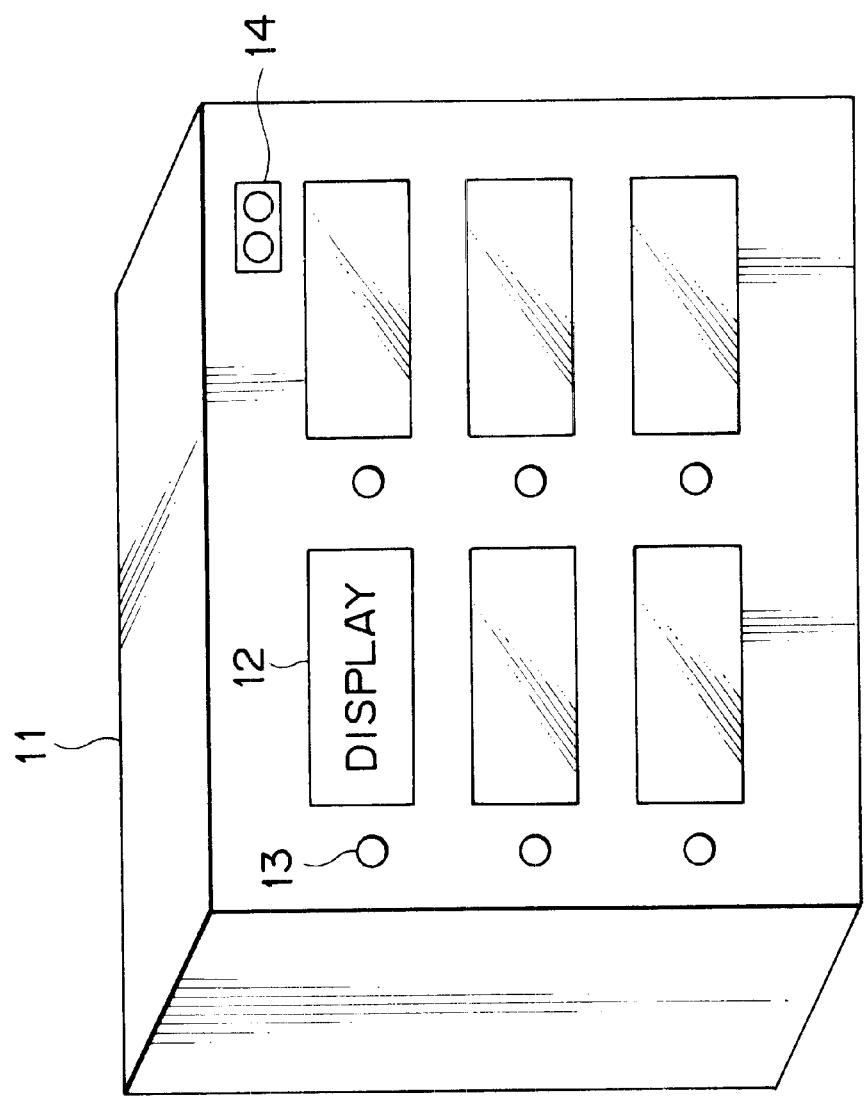
FIG. 2 is a drawing showing an external view of the information provider unit 11 for transmitting information to the information record/reproduction device 1.
Figure 4:
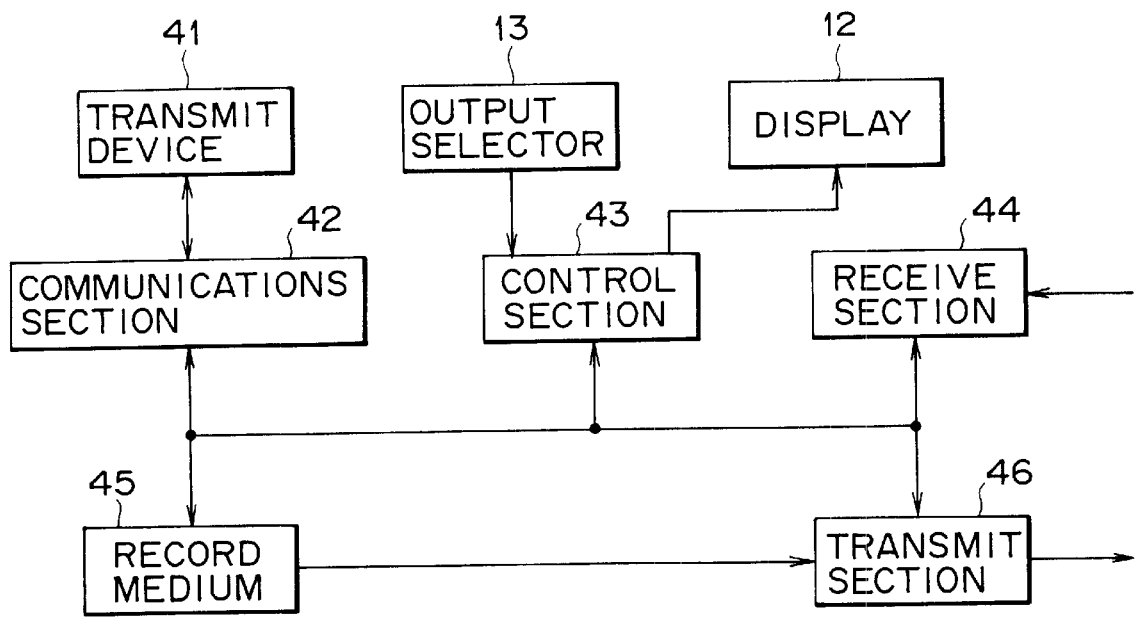
FIG. 4 is a block diagram showing the structure of the information provider unit 11 of FIG. 2.

FIG. 2 shows the external appearance of the information provider unit for supplying information to the information record/reproduction device of FIG. 1. The information provider unit 11 is configured to store in the record medium 45 (FIG. 4) the information previously transmitted from the transmit device 41 (FIG. 4). The plurality of displays 12 are configured to display information content and prices stored in the record medium 45. An output selector 13 for the display 12 is configured to receive the information selection made by the user. A transceiver section 14 is configured to communicate information in a non-physical contact manner, with an information record/reproduction device 1 by utilizing infrared rays.

Figure 3:
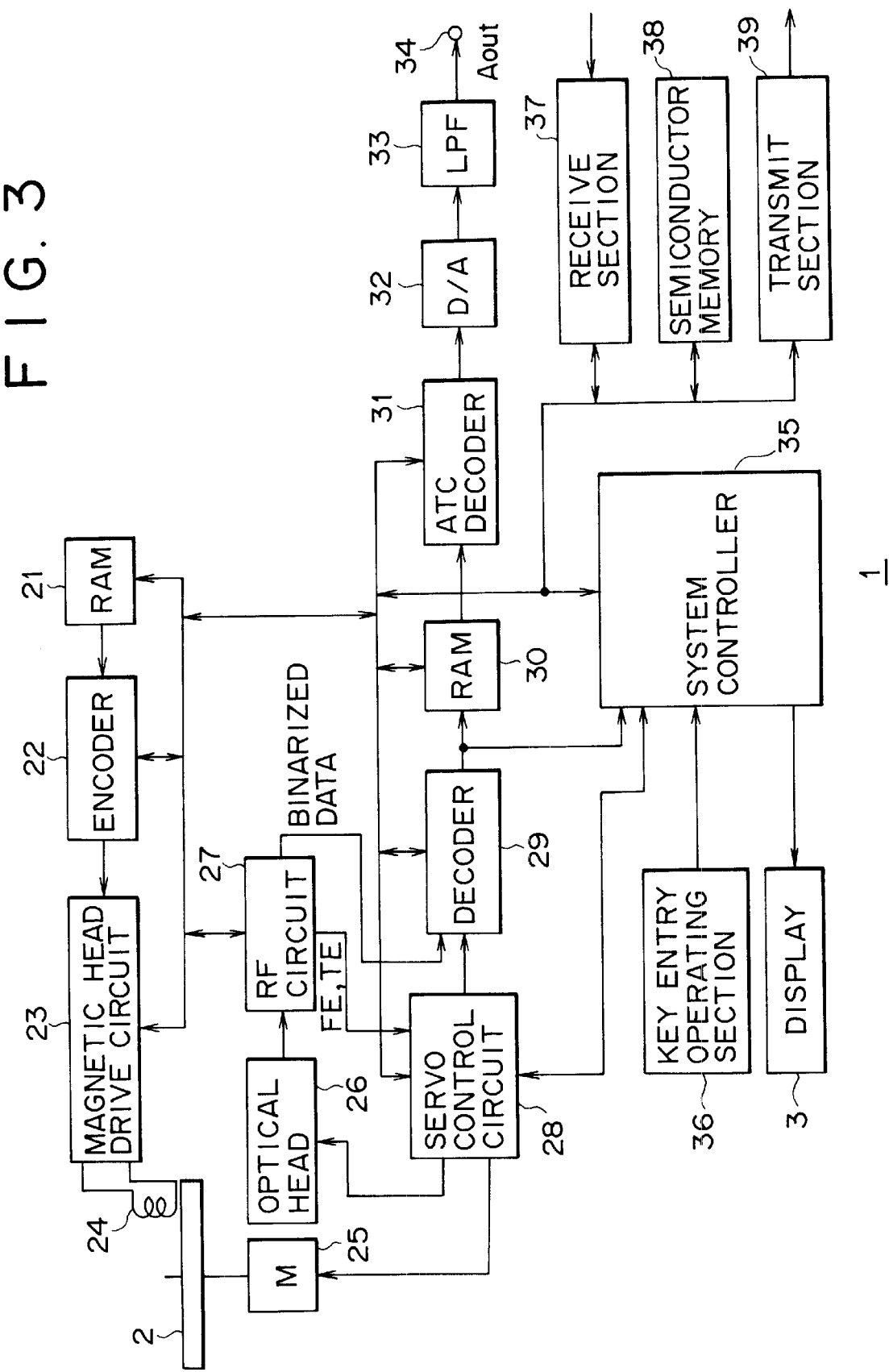
FIG. 3 is a block diagram showing the first embodiment of the information record/reproduction device 1 of FIG. 1.

FIG. 3 shows the first embodiment of the information record/reproduction device. In this information record/reproduction device 1, a spindle motor 25 rotates and drives an magneto-optic disk 2.

During recording of data on the magneto-optic disk 2, a laser beams for instance radiates from an optical head 26 and a modulated magnetic field is applied by the magnetic head 24 according to this recorded data. In other words, data is recorded along the magnetic track of the magneto-optic disk 2. During reproduction (playback), a laser beam from the optical head 26 traces along the recording track of the magneto-optic disk 2 and magnetic-optical reproduction thus performed.

The optical head 26 is comprised of optical components such as a laser pumped light source, a collimator lens, an objective lens, a polarized beam splitter and a cylindrical lens as well as a photo detector having a light receptor with a specific pattern. The optical head 26 is installed in a position complementary to the magnetic head 24 by way of the magneto-optic disk 2. When data is recorded on the magneto-optic disk 2, a magnetic head drive circuit 23 of the subsequently related recording system drives the magnetic head 24, and along with applying a modulated magnetic field to the magneto-optic disk 2 according to the recorded data, thermal magnetic recording is performed by magnetic modulation achieved by irradiating the laser beam from the optical head 26 onto the desired track of the magneto-optic disk 2. Further, the optical head 26 detects the light reflected from the laser beam irradiating on the desired track and detects focus errors by means of the so-called astigmatism method and also detects tracking errors by means of the so-called push-pull method. When reproducing data from the magneto-optic disk 2, the optical head 26 besides detecting focus errors and tracking errors, also simultaneously detects the difference in the polarization angles (Kerr rotation angle) of the reflected light from the laser beam irradiating onto the target disk and generates a reproduction (playback) signal.

The output of the optical head 26 is supplied to an RF circuit 27. The RF circuit 27 extracts the focus error signal and tracking error signals from the output of the optical head 26, supplies these signals to the servo controller 28 and also binarizes the reproduction (playback) signal and supplies this reproduction signal to the reproduction (playback) system of the decoder 29 related later on.

A servo controller 28 is for instance comprised of a focus servo control circuit, a tracking servo control circuit, a spindle motor servo control circuit and a thread servo control circuit, etc. The focus servo control circuit performs focus control of the optical head 26 in the optical system in order to minimize focus signal error. The tracking servo control circuit performs tracking control of the optical head 26 in the optical system in order to minimize the tracking signal error. Further, the spindle motor servo control circuit controls a spindle motor 25 to drive the magneto-optic disk 2 to rotate at a specific speed. The thread servo control circuit moves the optical head 26 and the magnetic head 24 to the desired track position on the magneto-optic disk 2 as specified by a system controller 35. After performing these various servo control operations, the servo controller 28 sends information to the system controller 35 indicating the operating status of each section under its control.

A key entry operating section 36 (including selector section 4 of FIG. 1) and a display 3 are connected to the system controller 35. The system controller 35 controls the recording system and reproduction system according to the entry operation information corresponding to the key entry operating section 36. The system controller 35 controls the record and reproduction (playback) positions on the record track traced by the optical head 26 and the magnetic head 24 based on items such as the header time and Q data of the subcode from the recording track on the magneto-optic disk 2. Further, the system controller 35 regulates display of the reproduction (playback) time on the display 3 based on the data compression rate and the reproduction (playback) position information on the recording track This reproduction (playback) time display is played back from the recording track on the magneto-optic disk 2. In other words, the actual time information is found by multiplying the inverse (for example, 4 when the data compression rate is ¼) of the data compression rate, by the address information (absolute time information) of the sector unit calculated based on information such as the header and subcode of the Q data. The product is then shown on the display 3 As for the recording time, when for example, the absolute time information is recorded (pre-formatted) beforehand on the magneto-optic disk 2, this preformatted absolute time information is loaded, the recording time at the actual position can be displayed by multiplying by the inverse of the data compression rate.

The system controller 35 also controls the receive section 37 (equivalent to the transceiver 6 of FIG. 1) to receive information transmitted from the information provider 11, the semiconductor memory 38 to store the received information, and also the transmit section 39 (equivalent to the transceiver 6 of FIG. 1) to transmit the specified information to an information provider 11 or another information record/reproduction device. The semiconductor memory 38 may be secured to the information record/reproduction device 1 or can be made detachable.

In the recording system of the information record/reproduction device 1, the information transmitted from the transceiver 14 of the information provider 11 is received at the receive section 37 and recorded at high speed on the semiconductor memory 38. When the information transmitted from the information provider 11 is audio information, this information is bit-compressed (data compression) at a specified data rate (encoded) for example, by ATRAC (Adaptive Transform Acoustic Coding) (commercial trademark) or an ATC (Adaptive Transform Coding) method having even higher compression efficiency such as ATRAC2.

The information recorded on the semiconductor memory 38 is transferred to the RAM 21 by control executed from the system controller 35. The read-out and writing of data from the RAM 21 is performed by control executed by the system controller 35. The RAM 21 is utilized as a buffer memory since the ATC data transferred from the semiconductor memory 38 is temporarily stored and then recorded on the magneto-optic disk 2 as needed.

The audio data or in other words, the recorded data loaded from the RAM 21 in bursts at an (instantaneous) transfer speed of 75 sectors per second, is supplied to an encoder 22. The number of units that can be consecutively recorded at one time in the data string supplied to the encoder 22 from the RAM 21 are handled as a plurality of sectors (for example 32 sectors) comprising the cluster and the several cluster (connection) sectors distributed around the cluster position. The data record range for these cluster (connection) sectors is set longer than the interleave length (32 sectors) of the encoder 22 in order to prevent the interleaved data from exerting an effect on other data clusters.

The encoder 22 performs encryption processing (parity addition and interleave processing) and EFM encryption on the record data supplied in bursts from the RAM 21 as related above. The recorded data which has been encoded by the encoder 22 is then supplied to the magnetic head driver circuit 23. This magnetic head driver circuit 23 drives the magnetic head 24 to apply a modulated magnetic field to the magneto-optic disk 2 according to the record data.

Along with performing the respective above described memory control for the RAM 21, the system controller 35 also controls the record position to allow consecutive recording of the recording data loaded in bursts from the RAM 21, onto the recording track of the magneto-optic disk 2. Control of this recording position is performed by the system controller 35, by monitoring the record position of the recording data read out in bursts from the RAM 21 and supplying a control signal to the servo control circuit 28 that specifies the record position on the recording track of the magneto-optic disk 2.

The recording of information onto the magneto-optic disk 2 may be commenced after writing all the information from the information provider 11 onto the semiconductor memory 38 or may be started in a state where a specified amount of the total information has been written into the semiconductor memory 38.

The reproduction (playback) system is described next. The purpose of the reproduction (playback) system is to reproduce the recording data recorded consecutively onto the record tracks of the magneto-optic disk 2. The reproduction (or playback) output acquired by tracking the optical head 26 tracing the recording track of the magneto-optic disk 2 with a laser beam is binarized (or binned) in the RF circuit 27 and supplies the binarized output to a decoder 29. The optical head 26 can read not only the magneto-optic disk 2 but can also read playback-only disks such as CD (compact disks).

The decoder 29 is designed for use with the encoder 22 in the above described record system and also performs processing such as decoding and EFM decoding to correct errors in the binarized reproduction output of the RF circuit 27. The above described ⅛ data compression ratio for the audio data is reproduced (or played back) at a transfer speed of 75 sectors per second which is higher than the normal transfer speed. The reproduction data obtained from the decoder 29 is supplied to the RAM 30.

When reproducing the information recorded in the semiconductor memory 38, the system controller 35 controls the operation so that the information recorded in the semiconductor memory 38 is transmitted.

The writing and reading of this data in the RAM 30 is controlled by the system controller 35 and the reproduction data supplied from the decoder 29 at a transfer speed of 75 sectors per second is sent in bursts at the same unchanged transfer speed of 75 sectors per second and written in the RAM 30. Further, the reproduction data from the RAM 30 which was written at a transfer speed of 75 sectors per second is consecutively read out at a transfer speed of 9.37 sectors per second corresponding to a data compression rate of ⅛.

When the system controller 35 writes the reproduction data on the RAM 30 at a transfer speed of 75 sectors per second, memory control is performed to consecutively read out the reproduction data from the RAM 30 at a transfer speed of 9.375 sectors per second. Besides the system controller 35 performing memory control on the RAM 30, the reproduction (playback) position is controlled for consecutive reproduction from the record track of the magneto-optic disk 2 of the reproduction data that was written in bursts onto the RAM 30 by means of the above described memory control. Control of the reproduction (playback) position is achieved by the system controller 35 monitoring the data from the reproduction position read out in bursts from the RAM 30 and supplying to the servo control circuit 28, a control signal specifying the reproduction position on the recording track of the magneto-optic disk 2.

The audio data acquired as the reproduction data read out consecutively at a transfer speed of 9.375 sectors per second from the RAM 30; is supplied to the ATC coder 31 using a method such as the above mentioned ATRAC or ATRAC2 method. The ATC coder 31 for example, expands the data eight-fold (bit expansion) so that 16 bit digital audio data is reproduced. The digital audio data from this ATC decoder 31 is supplied to a D/A converter 32.

The D/A converter 32 converts the digital audio data supplied from the ATC decoder 31 into an analog signal and forms the analog audio signal A OUT. The analog audio signal A OUT acquired by means of the D/A converter 32 is output from an output terminal 34 by way of a low-pass filter (LPF) 33.

Next, the information provider 11 is explained while referring to FIG. 4. A communications section 42 of the information provider 11 receives information from the transmit section 41 to send to the information provider 11 to supply to the information record/reproduction device 1 by means of control by the control section 43, and outputs this information to a record medium 45. The record medium 45 is configured to store the information input from the communications section 42.

The control section 43 displays on the display 12 (FIG. 2), the contents of the information recorded on the record medium 45. The control section 43 also detects operation by the user of the output selector 13 (FIG. 2), reads out the corresponding information from the record medium 45, and outputs that information at the transmit section 46.

The receive section 44 and the transmit section 46 are equivalent to the transceiver section 14 in FIG. 2 and are configured to transmit and receive information with the information record/reproduction device 1 based on control from the control section 43. Detailed information on the receive section 46 and the transmit section 46 are related later on, respectively in FIG. 10 and FIG. 11.

Figure 5:
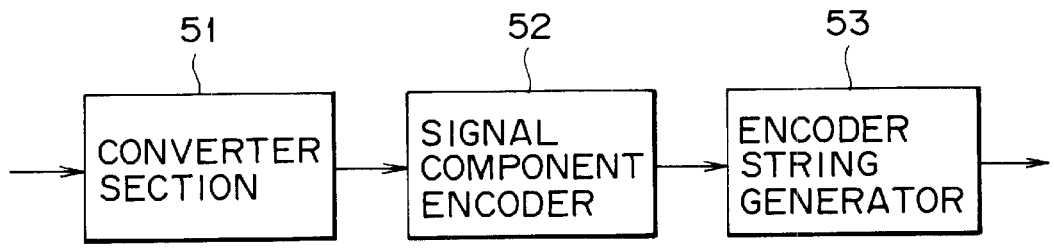
FIG. 5 is a block diagram showing the structure of the transmit device 41 of FIG. 4.

FIG. 5 shows the structure of the transmit device 41 of FIG. 4. The transmit device 41 is comprised of a converter 51 to convert the input signal into optical spectrum components, a signal component encoder 52 to encode the output from the converter 51, and an encoder string generator 53 to generate and output a code string from the output of the signal component encoder 52. The transmit device 41 utilizes SBC (separate band coding), ATC (adaptive transform coding) and adaptable bit assignments to encode the audio PCM signal with high efficiency and send this signal to the information provider 11.

The structure of the converter 51 is shown in FIG. 5. In the converter 51, the input signal is split into the specified frequency bands (in this example, separated into two frequency bands) by a band separation filter 61. The respective signals from these two frequency bands are converted into spectral components in sequence, by the sequential spectral converters 62-1 and 62-2 and then output to a signal component encoder 52 in a latter stage.

The band separation filter 61 is comprised of a so-called PQF (Polyphase Quadrature Filter). The signal that is output from the band separation filter 61 is a signal that is reduced to one-half of the signal input to the band separation filter 61. A high frequency resolution can be obtained while limiting the amount of buffer memory required for spectrum conversion.

Figure 7:
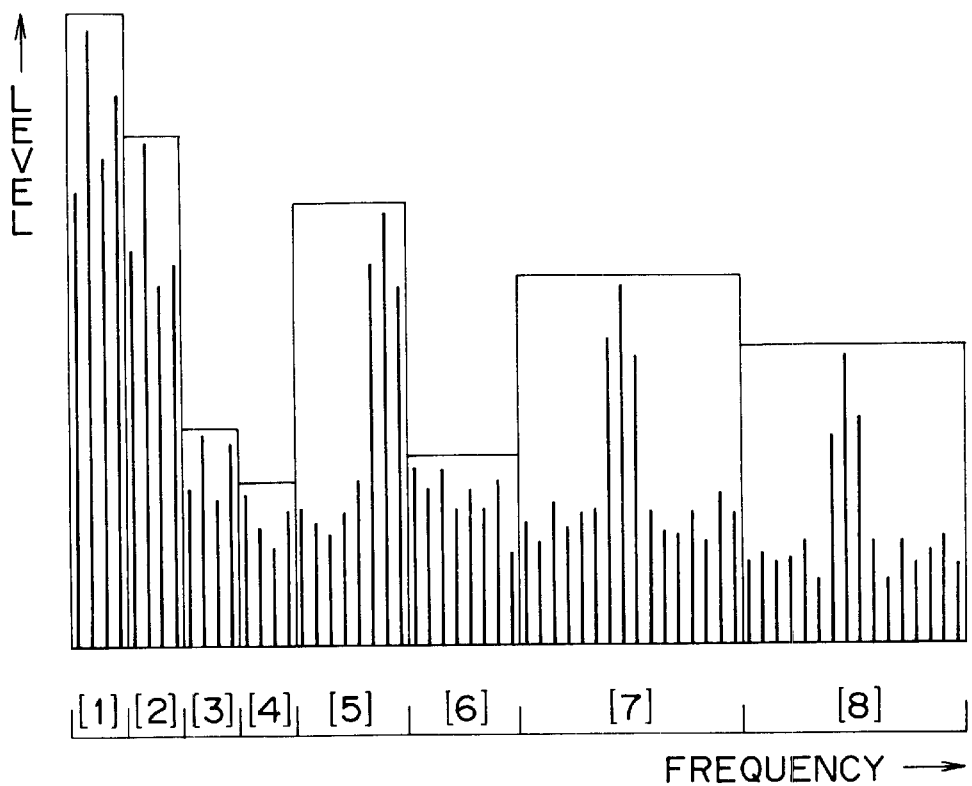
FIG. 7 is a graph illustrating the output of the converter sect ion 51 of FIG. 5.

An example of the output of the sequential spectral converters 62-1 and 62-2 is shown in FIG. 7. In this figure, the vertical axis shows the absolute value level for the spectrum of the MDCT (Modified Discrete Cosine Transform) converted into decibels. The input signal is converted into 64 spectral signals for each specified time block, these 64 signals separated into eight bands (encoding units) and each of these encoding units normalized and quantized by the signal component encoder 52 of a latter stage.

Figure 8:
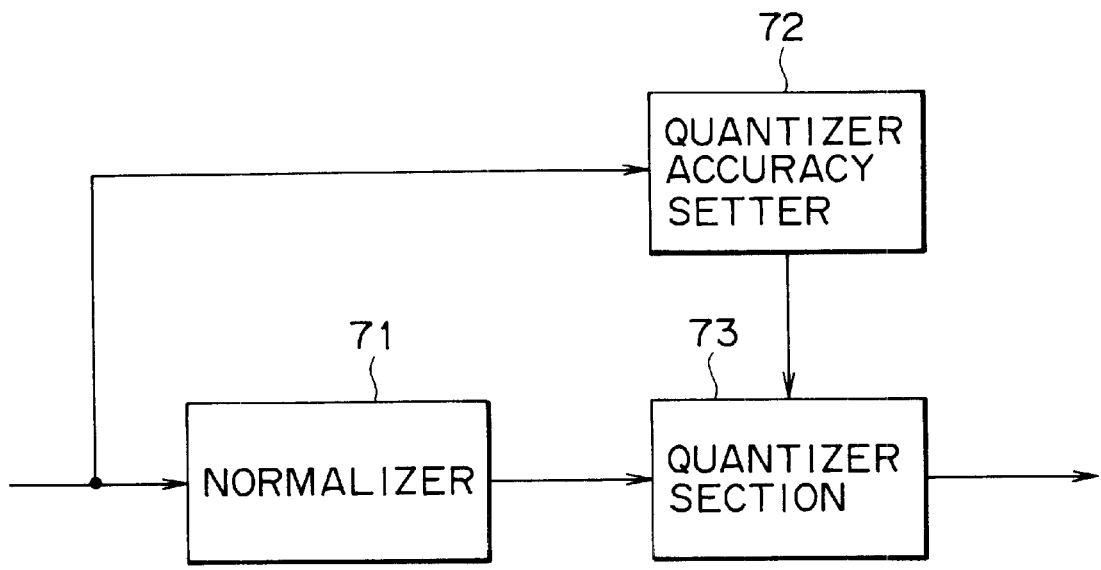
FIG. 8 is a block diagram showing the structure of the signal component encoder 52 of FIG. 5.

The structure of the signal component encoder 52 of FIG. 5 is shown in FIG. 8. The spectrum components output from the sequential spectral converters 62-1 and 62-2 are input to the normalizer 71 and quantizer accuracy setter 72. The normalizer 71 normalizes each level for each band (encoding unit) based on the maximum value within that band and sends an output to the quantizer section 73. The normalized signal level input from the normalizer 71 is quantized in the quantizer section 73 according to the quantizing accuracy input from the quantizer accuracy setter 72. This process allows effective encoding that holds deterioration in tone quality to a minimum. The quantizer section 73 in addition to the quantized signal components also outputs quantized accuracy information and normalizing coefficient information to the encoder string generator 53.

In addition to the above encoding, even further effective coding can be performed at high compression rates for example by variable length encoding, or by isolating particularly important tones for auditory sensations within the spectral signal as proposed by this inventor in Japanese Patent Application No. Hei 7-500482. In other words, a method that isolates signal components whose energy is concentrated in a designated frequency periphery and encoding them separately from other spectral components.

Figure 9:
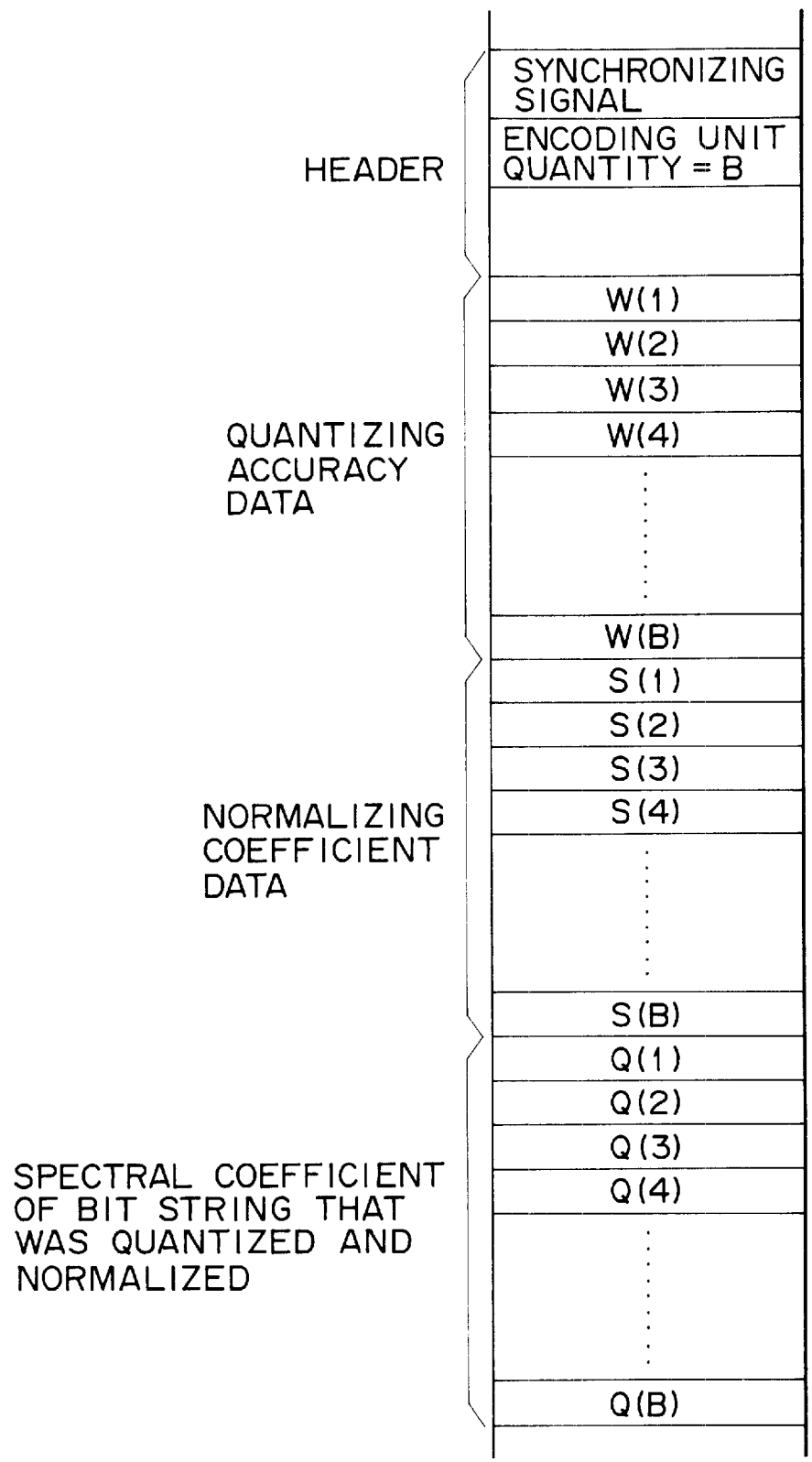
FIG. 9 is a drawing illustrating the output of the encoder string generator 53 of FIG. 5.

The encoder string generator 53 utilizes the encoding input from the quantizer section 73 to generate a code string in a format as shown for example in FIG. 9. In this example, the header is placed at the beginning, and a synchronizing signal, and an encoded unit quantity (number split up into all bands of the spectrum) B are listed within the header. The quantizing accuracy data W(i), the normalizing coefficient data S(i) and also the bit string Q(i) (Here, i is a figure for 1 through B indicating each band.) of the spectral coefficient on which normalizing and quantizing were performed are listed in sequence after the header. The code string generated here is sent to the communications section 42 of the information provider 11.

The structure of the transmit section 46 of the information provider 11 is shown in FIG. 10. The modulator section 81 modulates the information input from the record medium 41 (information encoded and transmitted from the transmit device 41) based for instance, on IrDA (Infrared Data Association) standards, and outputs this modulated information to the infrared transmit section 82. This modulation of course does not always have to be based on IrDA standards. The infrared transmit section 82 comprised by an LED emits an infrared signal based on the output signal from the modulator section 81 and outputs the infrared signal to information record/reproduction device 1 by way of the optical filter 83.

By modulating the information with the modulator section 81 in this way utilizing a specific method, not only is multiplexing of the carrier frequency possible but the effect from peripheral light can be reduced and consequently, a wide bandwidth can be maintained for the carrier frequency so that transfer of information can be performed at high speed. At a sampling rate for instance of 44.1 kHz, applying data compression of 1/20th to a one hour portion of a stereo PCM signal with a 16 bit width will require an information capacity of approximately 254 megabits. However, if this quantity of information is multi-value modulated at a bandwidth of approximately 25 Mhz, and sent as a 50 Mbps infrared signal then the transmission can be completed in about 5 seconds. The structure of the transmit section 39 of the information record/reproduction device 1 shown in FIG. 3 is the same as shown in FIG. 10.

An (RF) radio signal can also be utilized when performing the non-contact communication of information as described above, however when performing communication on a one-to-one basis with a particular party, the method utilizing infrared signals with strong directivity will prove satisfactory to prevent signal contamination of the information.

FIG. 11 shows the structure of the receive section 44 of information provider 11. In the receive section 44, the infrared receiver 92 comprised of a photodiode receives the infrared signal from the transmit section 39 of the information record/reproduction device 1 by way of the optical filter 91 to eliminate the visible light portion. The infrared receiver 92 then converts this infrared signal into an electrical signal and outputs this signal to the decode section 913. The demodulator 93 performs demodulation of the signal output from the infrared receiver 92 on the portion modulated in the modulator 81 in FIG. 10, and outputs the demodulated information to the control section 43. The structure of the receive section 37 of the information record/reproduction device 1 shown in FIG. 3 is the same as shown in FIG. 11.

Figure 12:
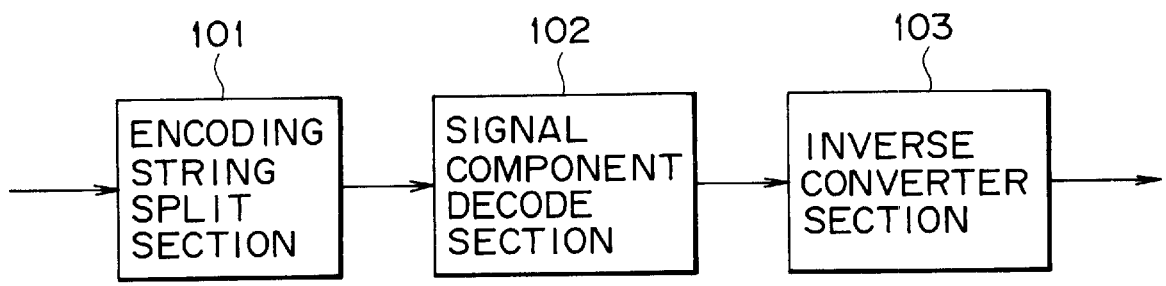
FIG. 12 is a block diagram showing the structure of the ATC decoder 31 of FIG. 3.

The AT C decoder 31 in the information record/reproduction device 1, for decoding the information (information encoded in the transmit device 41) supplied from the information provider 11 is next described while referring to FIG. 12. The encoding string split section 101 of the ATC decoder 31 splits the code string input from the RAM 30 into the various signal components (quantizing accuracy data (i), the normalizing coefficient data S(i) and also the bit string Q(i) of the normalized and quantized spectral coefficient) and outputs these signal components to the signal component decode section 102. The signal component decode section 102 performs decoding of each of the signal components that were input from the encoding string split section 101 on the portion encoded in the signal component encoder 52 of FIG. 5, and outputs these decoded signal components to an inverse converter section 103. The signal output from the signal component decode section 102 is converted to a sound signal by the inverse converter section 103 and output to the D/A converter 32.

Figure 13:
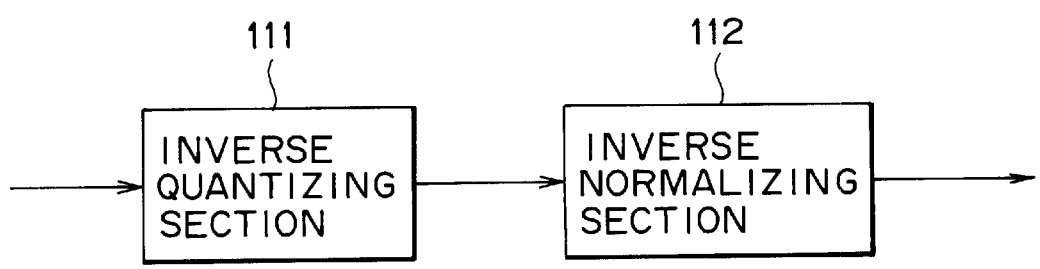
FIG. 13 is a block diagram showing the structure of the signal component decoder 102 of FIG. 12.
Figure 14:
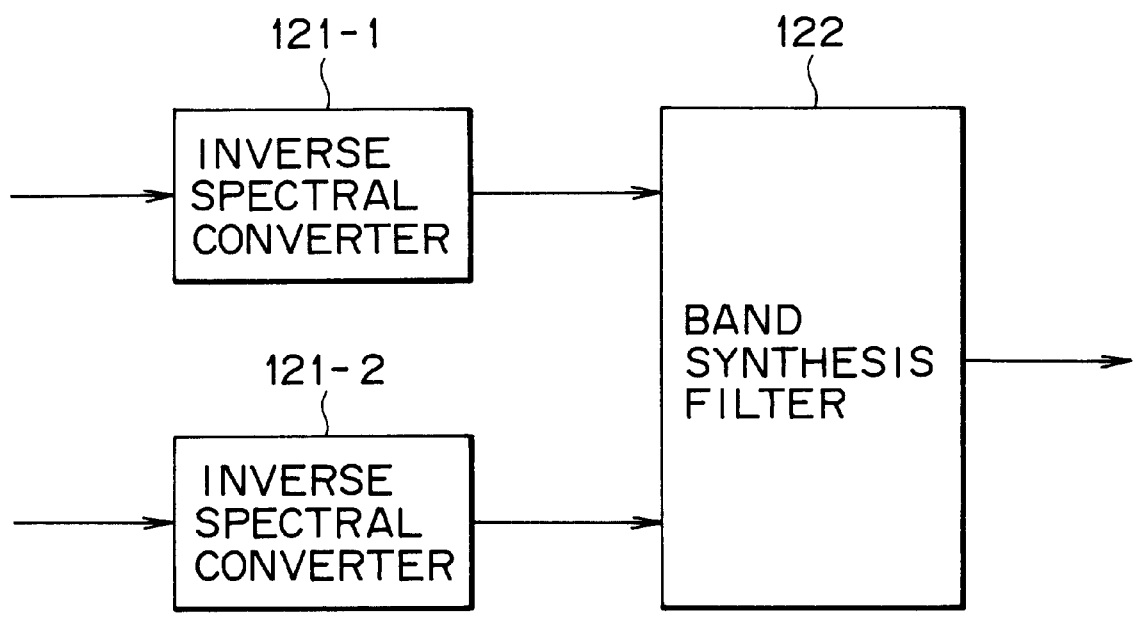
FIG. 14 is a block diagram showing the structure of the inverse converter 103 of FIG. 12.

The structure of the signal component decode section 102 of FIG. 12 is shown in FIG. 13. Inverse quantizing and inverse normalization of portions processed in the quantizer section 73 and the normalizer 71 are respectively performed in an inverse quantizing section 111 and an inverse normalizing section 112

Figure 6:
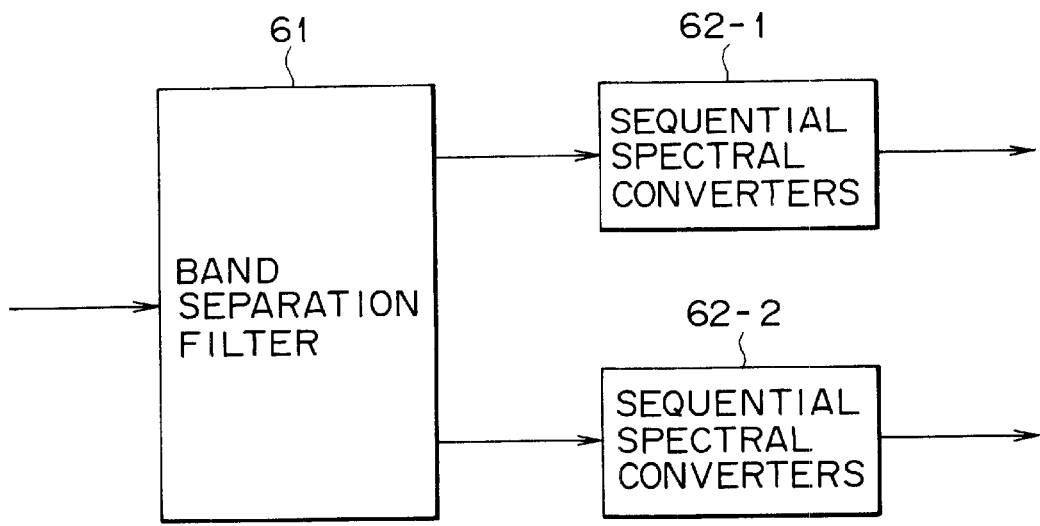
FIG. 6 is a block diagram showing the structure of the converter section 51 of FIG. 5.

The structure of the inverse converter section 103 is shown in FIG. 12. The inverse spectral converters 121-1 and 121-2 as well as the band synthesis filter 122 correspond respectively t the sequential spectral converters 62-1, 62-2 and the band split filter 61 of FIG. 6. The inverse spectral converters 121-1 and 121-2 respectively convert the input spectral components into frequency band signals. The band synthesis filter 122 synthesizes the frequency band signals input from the inverse spectral converters 121-1 and 121-2.

The above mentioned embodiment performs communication Utilizing an infrared signal with strong directivity so that even though the contamination or leakage of information is prevented, the communication is performed in a non-contact manner so that the information transmitted from the information provider unit 11 might possibly be acquired by an illegal means.

The information acquired from the information provider unit 11 in the information record/reproduction device 1 can be recorded onto an magneto-optic disk 2 so that the information from the information provider unit 11 might possibly be copied in large amounts (illegal copies might be manufactured). Accordingly, the information provided to thee information record/reproduction device 1 from the information provider unit 11 as well as the information recorded on the magneto-optic disk 2 in the information record/reproduction device 1 is preferably encoded so that only a particular user (or the information record/reproduction device 1) can use the information.

Figure 15:
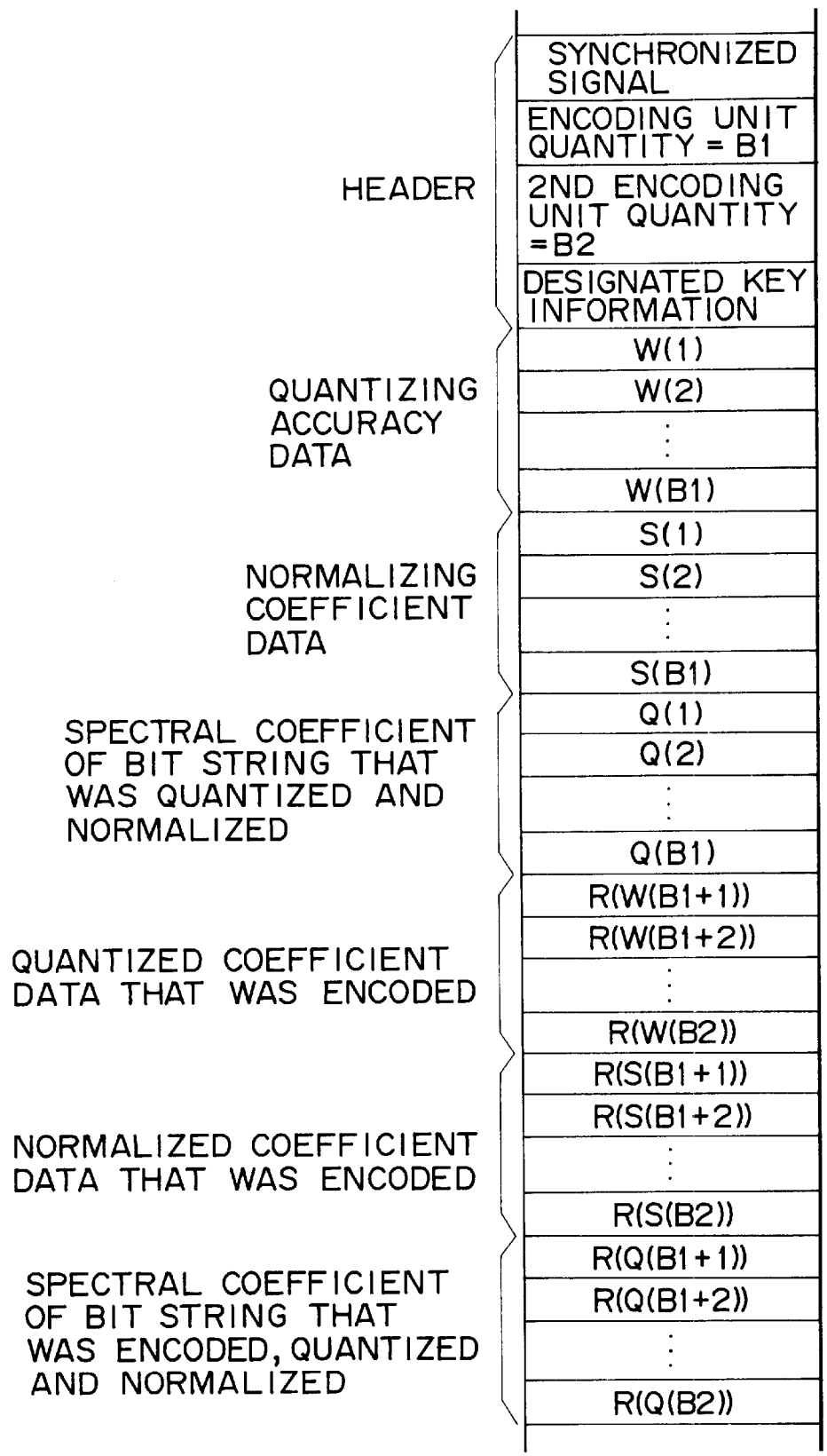
FIG. 15 is a drawing illustrating the encoded output of the transmit device 41.

An example of the encoded format is shown in FIG. 15. Inside the header for this encoded format, are listed the synchronized signal, the encoding unit quantities B1 and B2 just the same as the header of the format shown in FIG. 9. These encoding unit quantities B1 and B2 are a quantity equivalent to the encoding unit quantity B of FIG. 9, and the number of non-encrypted units from among the total encoding unit quantity B are shown as the encoding unit B1 quantity and the encrypted units from among the total encoding unit quantity B are shown as the encoding unit B2 quantity.

The respective non-coded quantizing accuracy data W(i) for each band, the normalizing coefficient data S(i) and also the bit string Q(i) (Here, i is a figure for 1 through B1 indicating each band.) of the spectral coefficient on which normalizing and quantizing were performed are listed in sequence after the header. Next, listed in the sequence after this respective information comes the quantizing accuracy data R (W (B1+1)) encoded for each band, the normalized coefficient data R (S (B1+i)), as well as the bit string R (Q (B1+i)) for the normalized and encoded spectral coefficient (Here, is the figure for 1 through B2−B1)

When a code string listed in this kind of format is decoded (reproduced) without using a key for decoding the encryption, decoding (reproduction) is performed only for encoding units from the lower band frequency counting up to the B1th encoding unit. If decoding (reproduction) is performed for all encoding units by decoding with a key, then all the encoded units are decoded (reproduced). In the above mentioned format, when all the band signals were encrypted, in other words the encoding unit quantity B1 is set to zero (0), the case is also included where the encoding unit quantity B2 is equal to the total encoding unit quantity B.

Figure 16:
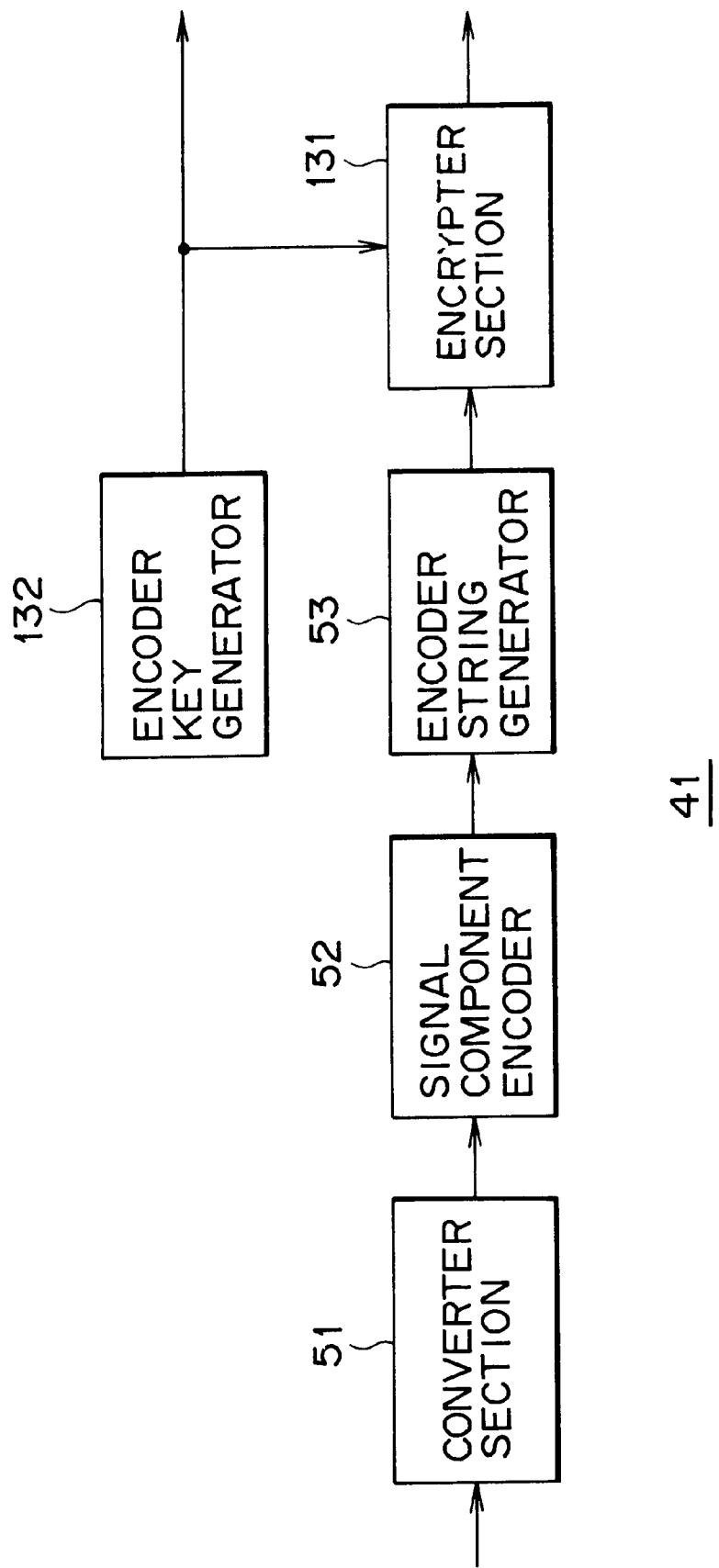
FIG. 16 is a block diagram showing another embodiment of the transmit device 41.

FIG. 16 shows the structure of the transmit device 41 for output of an encrypted code string such as shown in FIG. 15 to the information provider unit 11. This structure is the encrypter section 131 and the encrypter key generator 132 added to the structure shown in FIG. 5. Accordingly, normalizing coefficient information and quantizing accuracy information from the encoder string generator 53 is output to the encrypter key generator 132 in addition to the quantized signal components.

The encrypter key generator 132 issues a random number for use as the encryption key and outputs this random number to the information provider unit 11 and the encrypter section 131. One method to issue a random number for example, is to sum the time data consisting of several dozen bits obtained from the internal clock of the transmit device 41 (not shown in drawing) with data sampled at a timing specified by the noise from a source external to the equipment, then extract a specified N bit from the summed result to utilize as the random number.

Figures 17, 18:
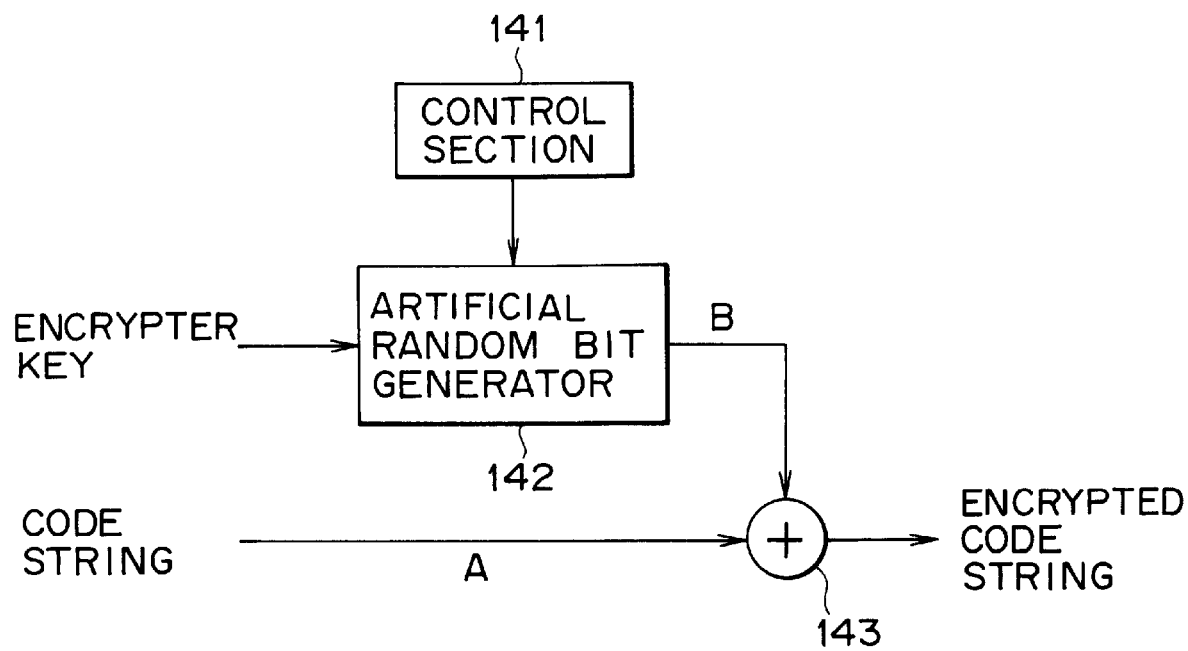
FIG. 17 is a block diagram showing a structure of the encrypter section 131 of FIG. 16.
FIG. 18 is a table illustrating the processing by the exclusive OR circuit 143 of FIG. 17.

The structure of the encrypter section 131 of FIG. 16 is shown in FIG. 17. The control circuit 141 controls each section of the encrypter section 131 to encrypt all encoding units input from the encoder string generator 53 counting from the lower band of frequencies from B1 onwards, based on the specified encoding unit quantity B2. The artificial random bit generator 142 squares the N bit input from the encrypter key generator 132 to establish an initial value for the encrypter key, and repeatedly extracts an N bit at the position specified from the results of the squaring. The artificial random bit generator 142 links the N bit strings that were extracted in sequence and sends the output to the exclusive-OR circuit 143 as a artificial random bit string.

The exclusive-OR circuit 143 as shown in FIG. 18, performs the exclusive-OR logic operation on the encoding string A input from the encoder string generator 53 and on the artificial random bit string B input from the artificial random bit generator 142. The results of this logic operation are sent to the information provider unit 11 as encrypted information (code string).

Figure 19:
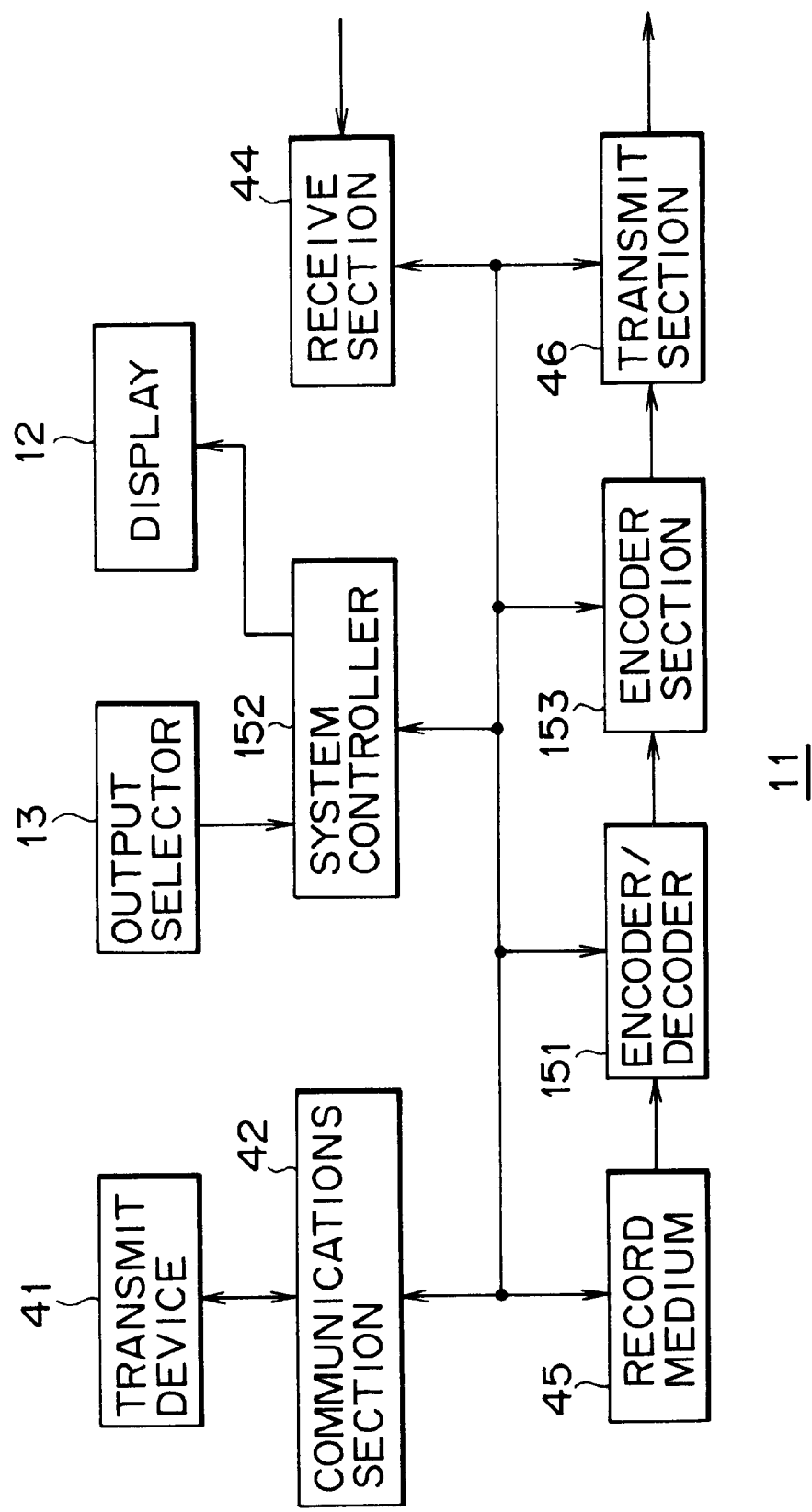
FIG. 19 is a block diagram showing the second embodiment of the information provider 11 of FIG. 2.

FIG. 19 shows the structure of the information provider unit 1 for the transmit device 41 of FIG. 16. In this structure, a system controller 152 has been installed instead of the control section 43 shown in FIG. 4 and a encoder/decoder 151 as well as an encoder section 153 have been added.

In this information provider unit 11, the encrypted information (exclusive-OR sum of A and B) sent from the transmit device 41 under control of the system controller 152 is received at the receive section 42 and recorded in the record medium 45. The encrypter key sent from the transmit device 41 sent from the transmit device 41 is input to the encoder/decoder 151. The information recorded on the record medium 45 is read out by the encoder/decoder 151 and decoded according to the encrypter section 131 of FIG. 16 by utilizing the encrypter key. The output signal from the encoder/decoder 151 is once again encrypted in the encoder section 153 and transmitted to the information record/reproduction device 1 from the transmit section 46.

Figure 20:
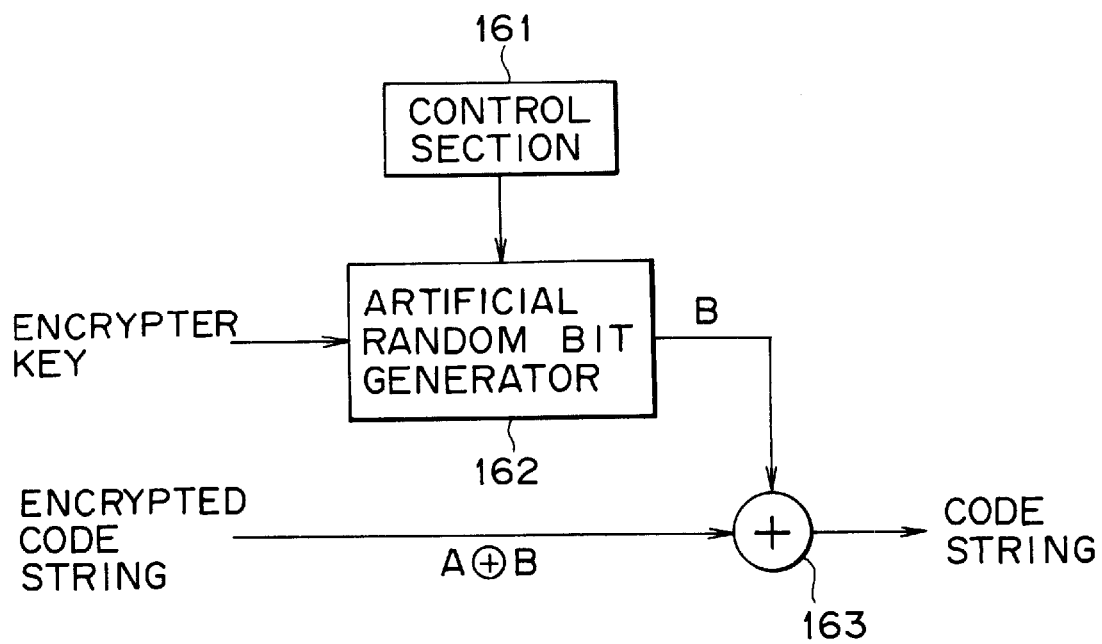
FIG. 20 is a block diagram showing the structure of the encoder/decoder 151 of FIG. 19.

The structure of the encoder/decoder 151 is shown in FIG. 20. Under control by the control section 161, the artificial random bit generator 162 squares the N bit input from the encrypter key generator 162 to establish an initial value for the encrypter key, and repeatedly extracts an N bit at the position specified from the results of the squaring. The artificial random bit generator 162 further links the N bit strings that were extracted in sequence and sends the output to the exclusive-OR circuit 163 as a artificial random bit string. The encrypter key input to the encrypter key generator 162 is the same as input to the artificial random bit generator 142 so that the artificial random bit strings output respectively from the artificial random bit generator 142 and 146 become equal.

The exclusive-OR circuit 163 performs exclusive-OR logic processing of the encrypted information read from the record medium 45 (exclusive-OR sum of A and B) and artificial random bit string B output from the artificial random bit string generator 162, and outputs the result to the encoder section 153 of a subsequent stage. The result of this operation, as shown in FIG. 18 becomes equal to the code string A input from the signal component encoder 52 so that the coding encrypted in the encrypter section 131 of FIG. 16 is decoded.

If the information sent from the transmit device 41 is not encrypted, then an encoder/decoder 151 may not always be required, but information from the transmit device 41 is preferably encrypted in view of the possibility that information might leak between the transmit device 41 and the information provider unit 11.

Figure 21:
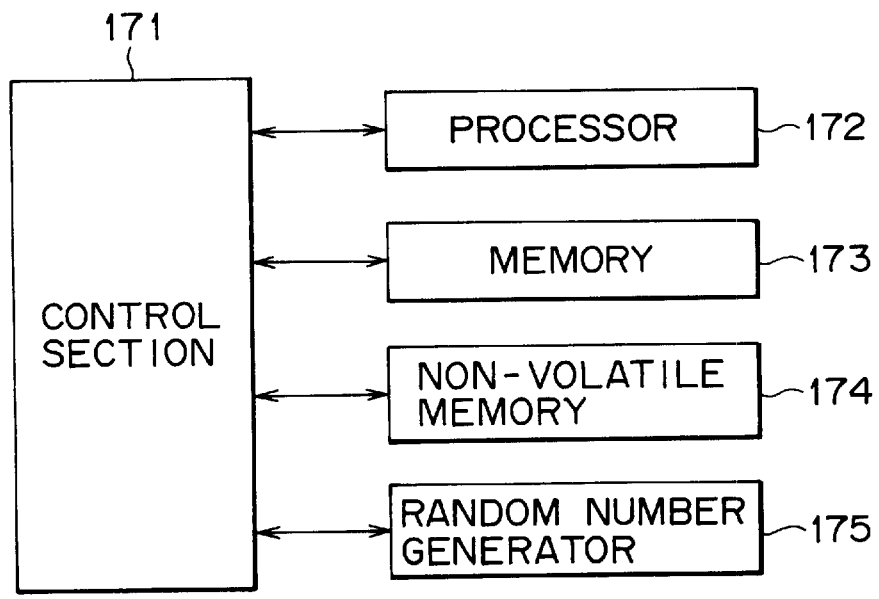
FIG. 21 is a block diagram showing the structure of the system controller 152 of FIG. 19.

As shown in FIG. 21, the system controller 152 is comprised of a control section 171, a processor 172, a memory 173, a non-volatile memory 174 and a random number generator 175. The control section 171 operates the processor 172 through the random number generator 175 as needed and performs overall control of the information provider unit 11. The control section 171 for instance, controls encryption by the encoder section 153 by utilizing the various data stored in the non-volatile memory 174. The control section 171 also utilizes the random number generated by the random number generator 175 to perform verification (certify) processing of the receive section 44 (Refer to FIG. 24 related later on for more details.) and the transmit section in the information record/reproduction device 1.

As shown in FIG. 22, a CA public key CAP, a unit identification No. ID, a correctness check data CT, a communication public key CMP, a communication private key CMS, and a data encoding private key DEK are stored on the non-volatile memory 174, for the CA (Certification Authority) private key CAS. The same types of data are also stored in the system controller 35 of the information record/reproduction device 1.

Prior to an explanation of the CA (Certification Authority) key CAP, etc., the encryption for the encoder section 153 of the information provider unit 11 will first be explained. Just as with the encoder section 131, the encoder section 153 generates an artificial random bit string from the output signal from the encoder/decoder 151 and performs encryption utilizing exclusive-OR logic operation. However, the encryption key K[AB] is determined by means of communication with the information record/reproduction device 1 which is the transmit destination.

Cryptography and verification technology are utilized in the process for determining the encryption key K[AB] needed for the public key encryption.

In cryptography or encryption technology utilizing public key encryption, the encryption key used when encrypting the information and the decoding key used when decoding the encrypted information are different from each other. Either the encryption key or the decoding key is "public" or openly known, while the other key is confidential (not known). Naturally, making use of the "public" or known key to guess the other private key (secret key) is practically impossible.

When for instance, information is encrypted utilizing the public key, this encrypted information can only be decoded by using the private key so that the receiver of the information must be limited to those holding the private key. Conversely, encrypted information that can be decoded by using an public key can only be generated when the private key was used so that the private key serves as a means to certify that the sender of information is the correct party. Hereafter, a bit string A encoded by utilizing an encryption key B is listed as Enc (A, B) and an encrypted bit string A decoded by utilizing an encryption key B are listed as Dec (A, B).

Figure 23:
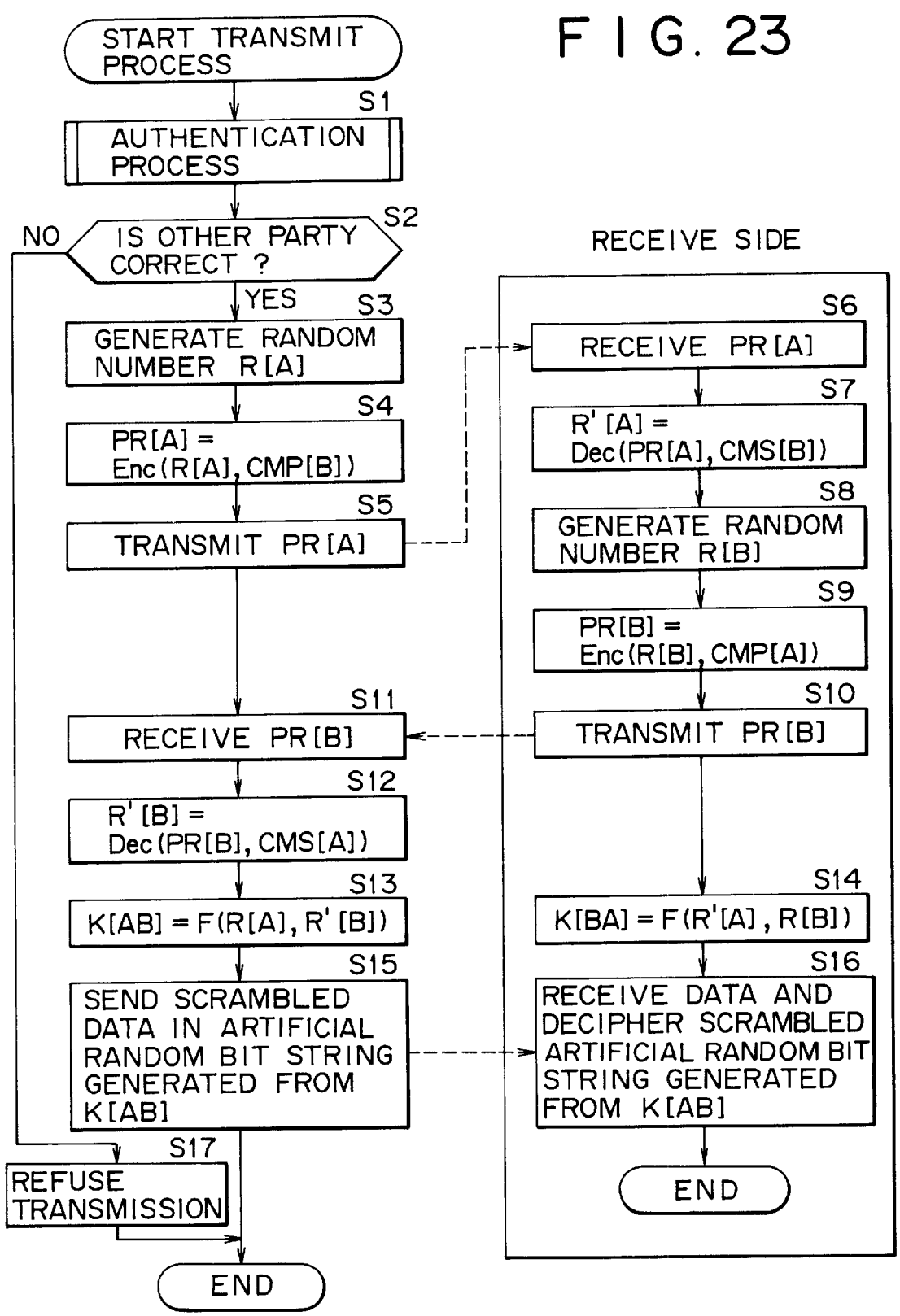
FIG. 23 is a flowchart illustrating the operation of the information provider 11 of FIG. 21.

A detailed description of encrypting technology utilizing public or disclosed key codes can be found for instance in "Cryptography and Data Security" by Dorothy Elizabety Robling Denning, 1982, Addison-Wesley Publishing Company, Inc., Reading, Mass. U.S.A. and in the Japanese language translation by Tadahiro Uezono, Kaku Kojima, Shoko Okujima; Baifukan Publishing The process for transmitting information to the information record/reproduction device 1 from the information provider unit 11 is explained while referring to FIG. 23. The user orients the transceiver section 6 of the information record/reproduction device 1 and the transceiver section 14 of the information provider unit 11 to face each other and when the user then operates the output selector 13 of the information provider unit 11, the information provider unit 11 in step S1 then executes authentication processing in order to check whether or not the information record/reproduction device 1 is the correct communication party. Next, the information record/reproduction device 1 executes the same processing to check whether or not the information provider unit 11 is the correct communication party.

Figure 24:
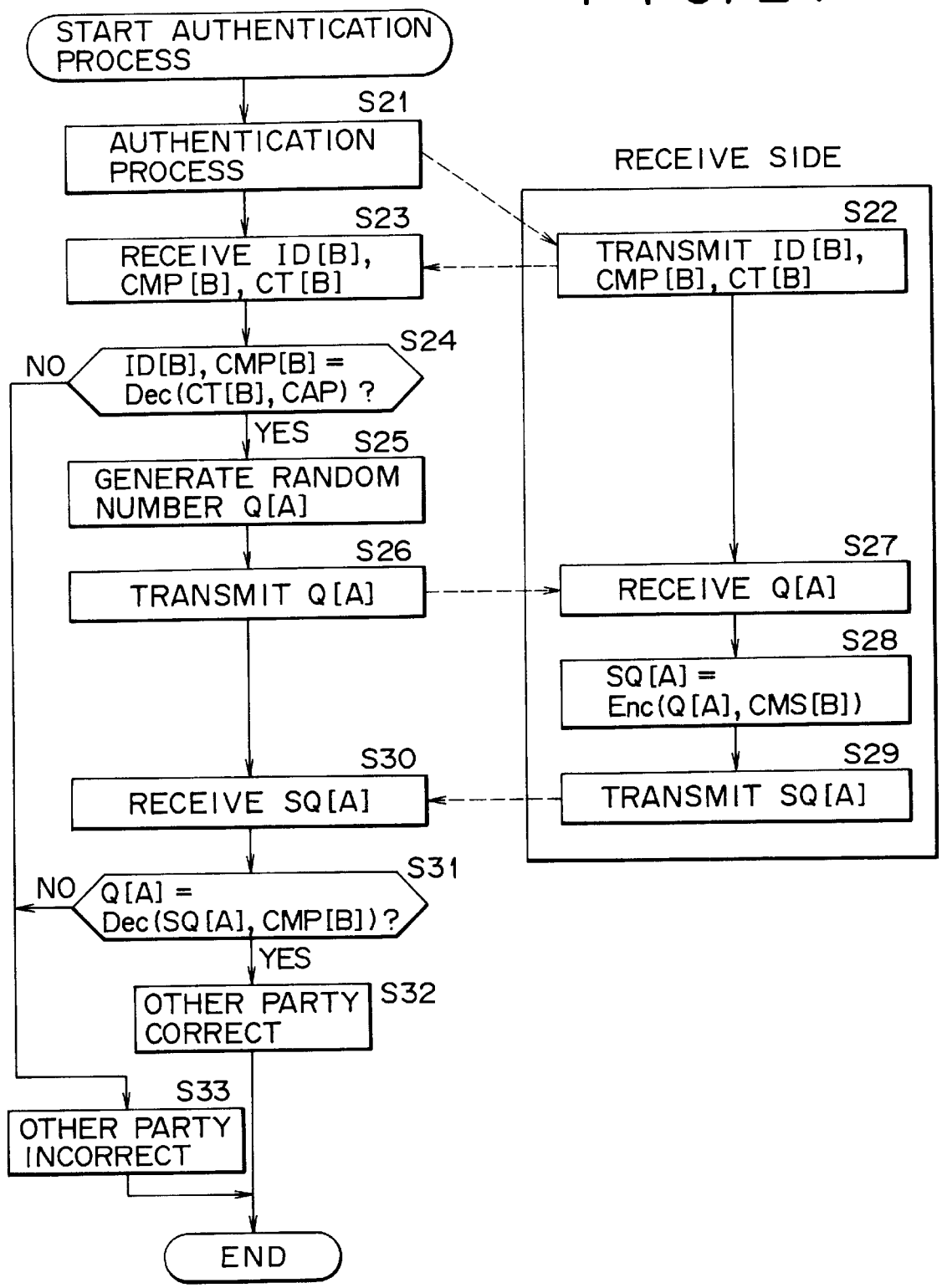
FIG. 24 is a flowchart illustrating the authentication processing of step S1 of FIG. 23.

The detailed operation of the authentication process is next explained while referring to the flowchart in FIG. 24. The authentication process will be explained as performed from by the information provider unit 11 on the information record/reproduction device 1, since the authentication process performed by the information record/reproduction device 1 and the information provider unit 11 is the same process.

In step S21, the system controller 152 of the information provider unit 11 controls the transmit section 46 to report the start of authentication processing to the information record/reproduction device 1. In step S22, the system controller 152 of the information record/reproduction device 1 that received the report of the start of authentication processing by way of the receive section 37, transmits it's own self-identity unit ID No. ID [B], communication public key CMP [B] as well as the correctness check data CT [B] to the information provider unit 11. Here, the correctness check data CT [B] is a bit string linking She self-identity unit ID No. ID [B] with the communication public key CMP [B] and encoded by the CA (Certification Authority) private key CAS. The certification authority public key CAP used for decoding the correctness check data CT [B] is held by the information provider unit 11 and the correct information record/reproduction device 1.

In step S23, the system controller 152 of the information record/reproduction device 1 receives the self-identity unit ID No. ID [B], the communication public key CMP [B] and the correctness check data CT [B] that were sent from the information record/reproduction device 1.

In step 24, the system controller 152 utilizes the certification authority public key CAP corresponding to the certification authority private key CAS to decode the correctness check data CT [B] received in step S23. A determination is made as to whether the results of that decoding are equivalent to the linked unit ID No. ID [B] and communication public key CMP [B] that were simultaneously received. If determined that the linked unit ID No. ID [B] and communication public key CMP[B] which were simultaneously received with the decoding results are in fact equivalent to those decoding results, then the correctness check data CT [B] received by the information record/reproduction device 1 was encoded by a certification authority private key CAS possessed only by the certifying authority and is therefore correct so the process then proceeds to step S25.

In step S25, the control section 171 of the system controller 152 issues a random number Q[A] to the random number generator 175, and in step S26, the random number Q[A] is transmitted to the information record/reproduction device 1.

In step S27, the system controller 35 of the information record/reproduction device 1 receives the random number Q [A] received by the information provider unit 11 and in step S28 the random number Q[A] is encrypted by utilizing the communication private key CMS[B] of the information record/reproduction device 1. The encrypted random number Q[A] is set as SQ [A].

In step S29, the system controller 35 of the information record/reproduction device 1 transmits the encrypted random number Q [A] to the information provider unit 11. In step S30, the system controller 152 of the information provider unit 11 receives the encrypted random number Q[A] sent from the information record/reproduction device 1.

In step S31, the system controller 152 of the information provider unit 11 decodes the encrypted random number Q[A] by utilizing the communication public key CMP [B] that the information record/reproduction device 1 received in step S23 and in step S26 a determination is made whether those decoded results are equivalent to the random number Q[A] that the system controller itself transmitted. If determined that the decoded results are equal to the random number Q[A] that it transmitted then the operation proceeds to step S32. In step S32, the information provider unit 11 determines that the communication party is the correct party.

However if in step S24, the decoding results are not found to be equivalent to the linked unit ID No. ID [B] and communication public key CMP [B] that were received simultaneously with the decoding results; or if in step S31 the decoding results found not to be equivalent to the random number that it sent, then in step S33 the system controller 152 of the information provider unit 11 determines that the communication party is not the correct party.

The information record/reproduction device 1 performs the same authentication process on the information provider unit 11.

Returning to FIG. 23, the information provider unit 11 determines in step S2 whether or not the communication party was found to be the correct party in the authentication process of step S1, and when the communications party is found to be correct, the operation proceeds to step S3.

In step S3, the control section 171 of the system controller 152 of the information provider unit 11 issues a random number R[A] to the random number generator 175. In step S4, the system controller 152 controls the encoder section 153, and the random number R[A] is encrypted by utilizing the communication public key CMP [B] that was received in step S23. Here, the encrypted random number R [A] is set as PR[A].

In step S5, the system controller 152 of the information provider unit 11 transmits the encrypted random number PR[A] to the information record/reproduction device 1.

In step S6, the system controller 35 of the information record/reproduction device 1 receives the random number PR [A] sent by the information provider unit 11. In step S7, the system controller 35 of the information record/reproduction device 1 decoded the encrypted random number PR [A] received in step S6 by utilizing its own communication private key CMS [B]. If the decoded random number is R'[A], then the random number R[A] encrypted in step S4 with the communication public key CMP[B], and the random number PR[A] decoded with the communication private key CMS [B] form a pair of matching keys so that the decoded random number R'[A] is identical to the random number R[A]

In step S8, the system controller 35 of the information record/reproduction device 1 generates a random number R[B] and in step S9 the random number R[B] is encrypted by utilizing the communication public key CMP[A] of the information record/reproduction device 1 received in the authentication process of step S1. Here, the encrypted random number R[B] is set as PR[B]. In step S10, the system controller 35 of the information record/reproduction device 1 transmits the encrypted random number PR[B] to the information provider unit 11.

In step S11, the system controller 152 of the information provider unit 11 receives the encrypted random number PR[B] sent by the information record/reproduction device 1. In step S12, the system controller 152 of the information provider unit 11 utilizes its own communication private key CMS [A] to decode the encrypted random number PR[B] received in step S11. If the decoded random number is R'[B], then the random number R[B] encrypted in step S9 with the communication public key CMP[A], and the random number PR[B] decoded with the communication private key CMS [A] form a pair of matching keys so that the decoded random number R'[B] is identical to the random number R[B].

In step S13, the system controller 152 of the information provider unit 11 applies the coefficient F held jointly by the information record/reproduction device 1 and the information provider unit 11 to the random number R[A] generated in step S3 and to the random number R'[B] decoded in step S12, and generates an encryption key (or session key) K[AB]. On the other hand, in step S14, the system controller 35 of the information record/reproduction device 1 applies the coefficient F held jointly by the information record/reproduction device 1 and the information provider unit 11 to the random number R[B] generated in step S8 and to the random number R'[A] generated in step S7, and generates an encryption key (or session key) K[AB]. Just as described above, the random number R'[A] is equal to the random number R[A]; and the random number R'[B] is equal to the random number R[B] so that the encryption key (or session key) K[AB] and the encryption key K[BA] are equal to each other.

In step S15, the encoder section 153 of the information provider unit 11 generates an artificial random bit string utilizing the encryption key (or session key) K[AB] just the same as for the encoder section 131 of the transmit device 41 shown in FIG. 16. The output signal of the encoder/decoder 151 is encrypted by performing exclusive-OR logic summing of the output signals from the encoder/decoder 151 and this artificial random bit string. The encrypted output of the encoder/decoder 151 is then sent to the transmit section 46. The transmit section 46 transmits this input signal to the information record/reproduction device 1 by using infrared rays.

In step S16, the information record/reproduction device 1 receives the information from the information provider unit 11 and stores the information into the semiconductor memory 38. The information recorded in the semiconductor memory 38 is decoded in the encoder/decoder section 182 described later on, just the same as for the encoder/decoder 151 of the information provider unit 11 shown in FIG. 20, by decoding with exclusive-OR logic summing and the artificial random bit string utilizing the encryption key (or session key) K[BA].

When determined in step S2 that the communication party is not correct, the operation proceeds to step S17. In step S17, the system controller 152 of the information provider unit 11 terminates communication with the communication party determined to be an incorrect party.

As described above, mutual authentication processing was performed when information was provided from the information provider unit 11 to the information record/reproduction device 1, and after the other communication party was determined to be the correct party, the information was scrambled (encrypted) utilizing an artificial random bit string and then transmitted so that the information was not provided to the incorrect communication party. Further, even in the event the wrong communication party acquired (intercepted) the information, this information is encrypted with encryption keys (or session keys) K[AB] and K[BA] based on random numbers mutually generated by the actual correct communication parties so that illegal decoding and playback of the encrypted information by the wrong communication party is impossible.

Figure 25:
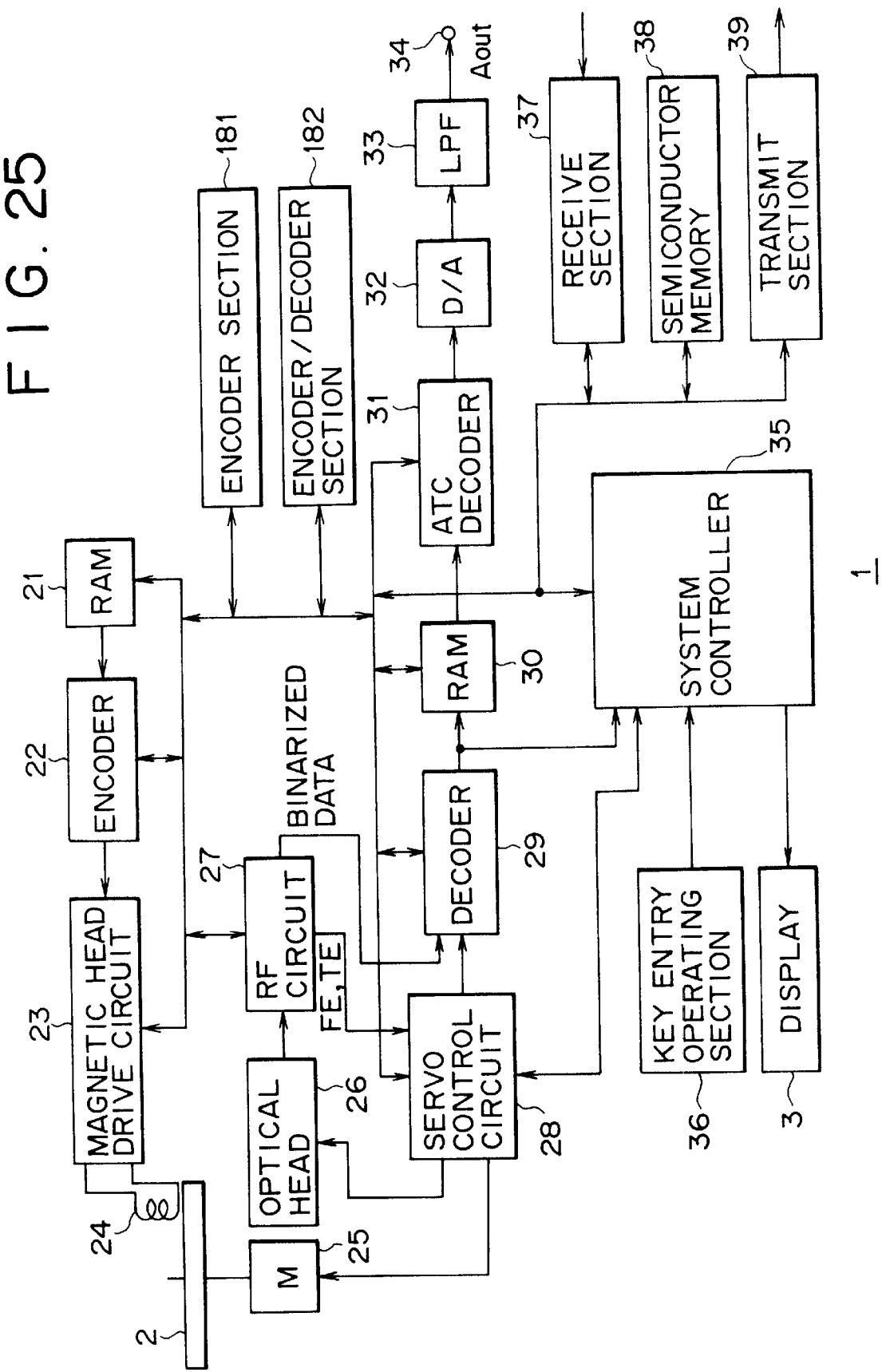
FIG. 25 is a block diagram showing the second embodiment of the information record/reproduction device 1 in FIG. 1.

The structure of the information record/reproduction device 1 for recording encrypted information from the information provider unit 11 onto the magneto-optic disk 2 is next described while referring to FIG. 25. This is the structure shown in FIG. 3 to which are added an encoder section 181 and a decoder section 182. Matching sections of the structure have the same reference numerals.

In the recording system of the information record/reproduction device 1, the encoder/decoder section 182 reads out the encrypted information from the information provider unit 11 that was recorded on the semiconductor memory 38, decodes this encrypted information by utilizing the above described encryption keys (or session keys) K[BA] and outputs this decoded information to the encoder section 181. The encoder section 181 encrypts the information decoded in the encoder/decoder section 182 and outputs this encrypted information to the RAM 21. The encrypted information that was input to the RAM 21 is recorded onto the magneto-optic disk 2 in the same way as described for the example in FIG. 3.

Figure 26:
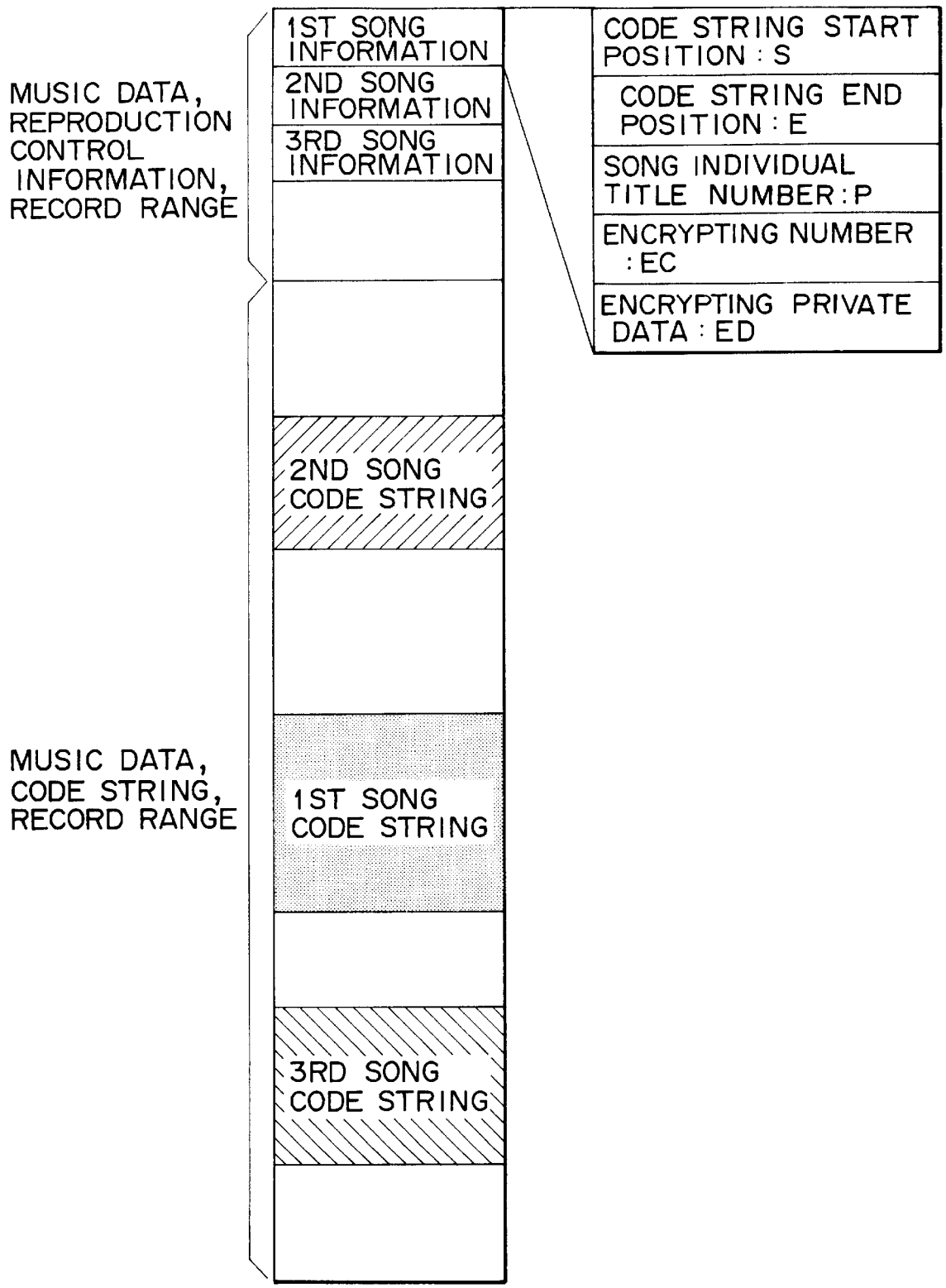
FIG. 26 is a drawing showing the output of the encrypter section 181 in FIG. 25.
Figure 27:
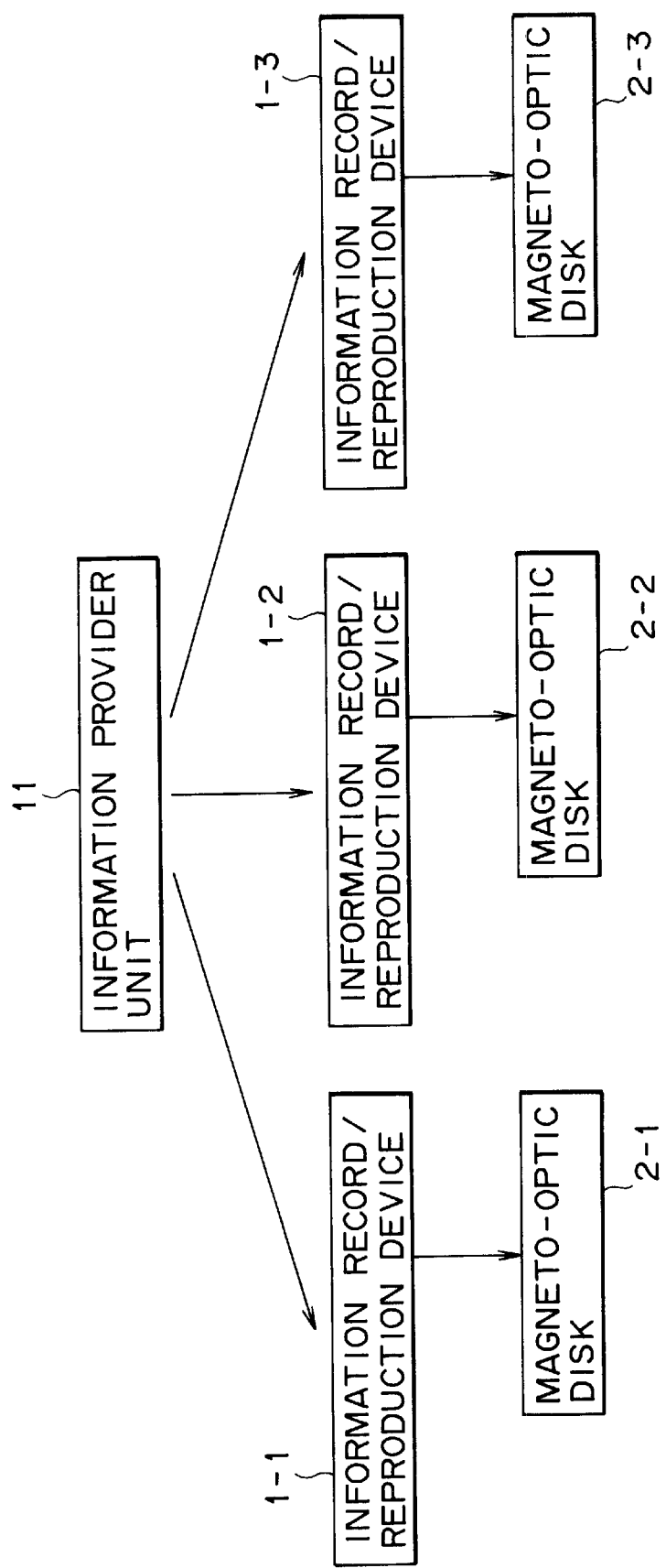
FIG. 27 is a concept view of the information provider 11 for providing information to a plurality of information record/reproduction devices.
Figure 28:
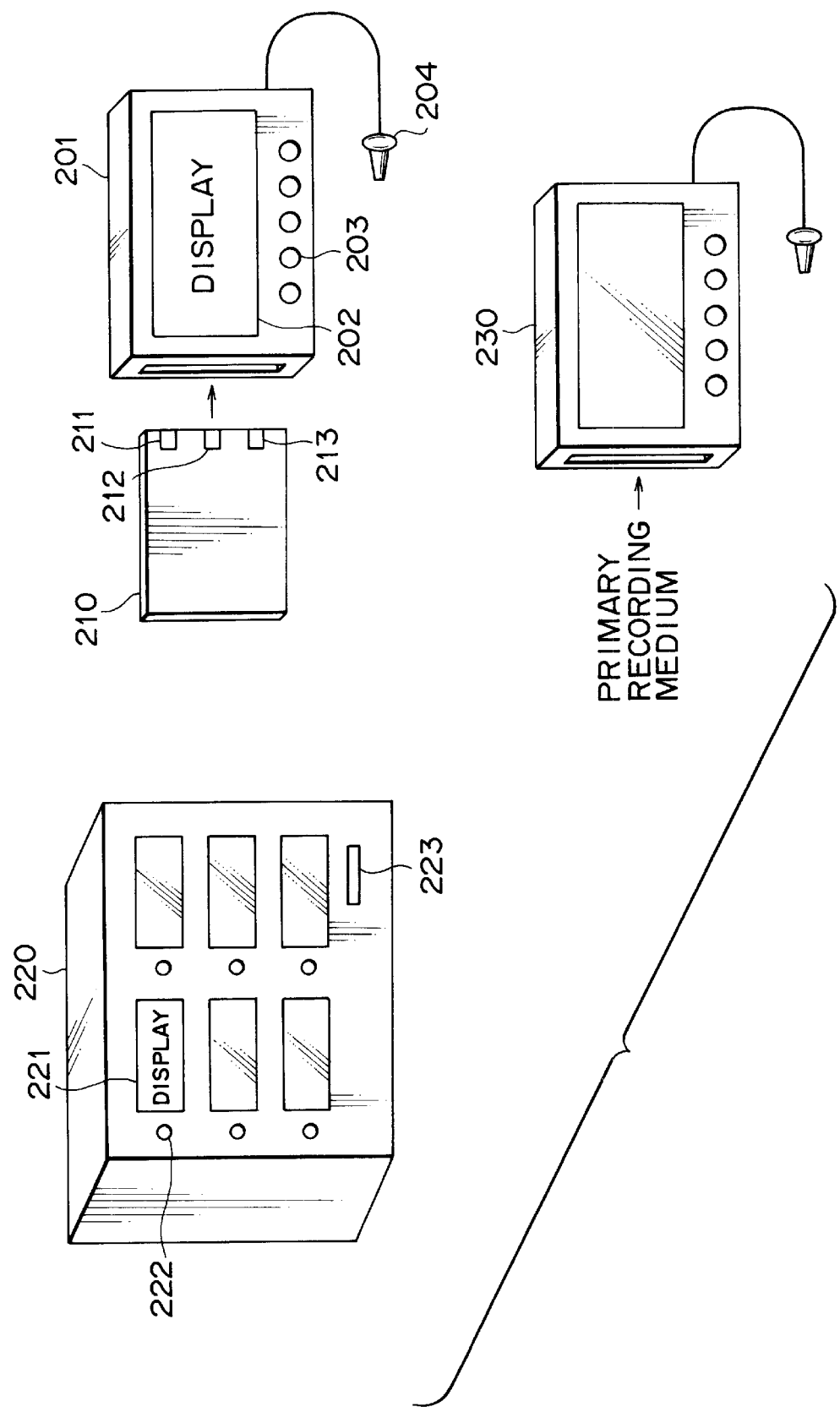
FIG. 28 is a drawing illustrating the information providing method of the conventional art.

FIG. 26 shows an example of the format for recording the audio information encrypted by the encoder section 181, onto the optical disk 2. In other words, in this format, a coded string encrypted with the each song is listed in the code string area; and information (playback information) for playing back (or reproducing) each song is listed in the playback control information record area. A code string start position S for the playback control information, indicates the start position when the code string for the song is recorded on the magneto-optic disk 2. A code string end position E indicates the end position when the code string for the song is recorded on the magneto-optic disk 2. A song individual title number P indicates the characteristic number of the song. An encrypting number EC indicates the encoder section 181 unit (equipment) ID. An encoding privacy data ED indicates the random number generated by the system controller for each song and is utilized for generating the encryption (or session key).

In encrypting one song for example, the song individual title number P, the encoding privacy data ED and the data encoding private key DEK stored on the system controller 35 together form a variable function key (P, DEK, ED) which is th e encryption (or session key). As related above, the song individual title number P, the encoding privacy data ED are unique to the particular song so that the (P, DEK, ED) encryption key is different for each song. Further, the data encoding private key DEK stored on the system controller 35 is contained in the variable of this (P, DEK, ED) encryption key so that even if the magneto-optic disk 2 is analyzed, the (P, DEK, ED) encryption key cannot be obtained. The information encrypted and recorded on this magneto-optic disk 2 can therefore not be played back on another information record/reproduction device.

In the playback (or reproduction) system of the information record/reproduction device 1, the information reproduced from the magneto-optic disk 2 is input to the encoder/decoder section 182 by way of a decoder 29 and input to a RAM 30 for decoding of the encryption that was performed in the encoder section 181. An explanation of the latter stage operation of the RAM 30 is omitted since the operation is identical to the embodiment of information record/reproduction device 1 shown in FIG. 3.

This invention can also be applied to cases when simultaneously providing information from an information provider unit 11 to a plurality of information record/reproduction devices 1-1 through 1-3. In such cases, the information provider unit 11 can encrypt and transmit decodable information if the information record/reproduction devices 1-1 through 1-3 possess a joint encryption key. The information record/reproduction devices 1-1 through 1-3 can decode the encrypted information transmitted from the information provider unit 11, and by utilizing the respectively different (P, DEK, ED) encryption keys can encrypt and record this information on the corresponding magneto-optic disks 2-1 through 2-3.

Accordingly, the magneto-optic disk 2-1 recorded on by the information record/reproduction device 1-1 cannot for example, be played back on the information record/reproduction device 1-2. Further, even in the event the information recorded on the magneto-optic disk 2-1 with the encryption key for decoding is used illegally, that encryption key cannot be used to play back the magneto-optic disk 2-2.

The example of this embodiment described the providing of audio information however this invention in not limited to audio information and may for instance be applied to the providing of other information such as image information.

Further in the embodiment of this invention, an magneto-optic disk was utilized as the secondary record medium however other recording mediums such as magnetic tape may also be utilized.

In addition to a record medium such as an magneto-optic disk, CD-ROM or fixed memory to provide a computer program to the user for performing processing, communication mediums such as networks and satellites may also be used.

This invention as described above, with an information record/reproduction device as claimed in claim 1, an information record/reproduction method as claimed in claim 7, and a supply medium as claimed in claim 8 is configured to record stored information on a record medium and is therefore capable of the speedy acquisition of information.

What is claimed is:

1. An information record/reproduction device for recording and reproducing information on a record medium, comprising:

receive means to receive information transmitted to the information record/reproduction device;

storage means to store the information received by the receive means;

encryption means to encrypt the information stored by the storage means; and record means to record onto a record medium the information encrypted by the encryption means, wherein said information is an audio signal divided into a plurality of bands, said encryption means encrypts at least one band of said plurality of bands of said information, and said record means records a number of said encrypted bands.

2. An information record/reproduction device as claimed in claim 1, further comprising reproduction means to reproduce information recorded on said recording medium or information stored by said storage means.

3. An information record/reproduction device as claimed in claim 1, further comprising decoding means to decode the encrypted information received by said receive means.

4. An information record/reproduction device as claimed in claim 1, wherein said storage means is a detachable semiconductor memory.

5. An information record/reproduction device as claimed in claim 1, wherein said recording means starts recording on said recording medium after said storage means has stored all the information received by said receive means.

6. An information record/reproduction device as claimed in claim 1, wherein said recording means starts recording on said recording medium after said storage means has stored a specific amount of the information received by said receive means.

7. An information record/reproduction method for recording or reproducing information on a recording medium, the method comprising the steps of:

receiving a transmitted information;

storing the received information;

encrypting the stored information; and recording the encrypted information onto a record medium, wherein said information is an audio signal divided into a plurality of bands, at least one band of said plurality of bands of said information is encrypted by said encrypting step, and a number of said encrypted bands are recorded by said recording step.

8. A supply medium on which an information record/reproduction device records or reproduces information obtained by way of a record medium, wherein said supply medium provides a program capable of being loaded into a computer for running said information record/reproduction device including the processing for performing the steps of:

receiving an information transmitted to the information record/reproduction device;

storing the received information;

encrypting the stored information; and recording onto a record medium the encrypted information, wherein said information is an audio signal divided into a plurality of bands, at least one band of said plurality of bands of said information is encrypted by said encrypting step, and a number of said encrypted bands are recorded by said recording step.

* * * * *